United States Patent [19]
Abramson et al.

[11] Patent Number: 5,577,200
[45] Date of Patent: Nov. 19, 1996

[54] METHOD AND APPARATUS FOR LOADING AND STORING MISALIGNED DATA ON AN OUT-OF-ORDER EXECUTION COMPUTER SYSTEM

[75] Inventors: Jeffrey M. Abramson, Aloha; Haitham Akkary, Portland; Andrew F. Glew, Hillsboro; Glenn J. Hinton; Kris G. Konigsfeld, both of Portland; Paul D. Madland, Beaverton, all of Oreg.

[73] Assignee: Intel Corporation, Santa Clara, Calif.

[21] Appl. No.: 550,573

[22] Filed: Oct. 31, 1995

Related U.S. Application Data

[63] Continuation of Ser. No. 202,445, Feb. 28, 1994, abandoned.

[51] Int. Cl.⁶ .............................. G06F 11/00; G06F 9/30; G06F 9/00; H01J 1/00
[52] U.S. Cl. .................. 395/185.03; 395/250; 395/376; 395/670
[58] Field of Search .................... 395/185.03, 185.02, 395/185.01, 184.01, 250, 375, 650

[56] References Cited

U.S. PATENT DOCUMENTS

| | | | |
|---|---|---|---|
| 4,722,049 | 1/1988 | Lahti | 364/200 |
| 4,803,615 | 2/1989 | Johnson | 364/200 |
| 4,807,113 | 2/1989 | Matsumoto | 364/200 |
| 4,991,090 | 2/1991 | Emma | 364/200 |
| 5,063,497 | 11/1991 | Cutler | 395/800 |
| 5,146,570 | 9/1992 | Hester | 395/375 |
| 5,191,653 | 3/1993 | Banks et al. | 395/275 |
| 5,197,130 | 3/1993 | Chen | 395/325 |
| 5,261,071 | 11/1993 | Lyon | 395/425 |
| 5,274,763 | 12/1993 | Banks | 395/250 |
| 5,293,603 | 3/1994 | MacWilliams et al. | 395/425 |

OTHER PUBLICATIONS

Smith & Pleszkun, Implementing Precise Interrupts in Pipelined Processors, IEEE Trans. on Comp., May 1988, vol. 37, No. 5, p. 562.

"The Metaflow Architecture", ©1991 IEEE, Jun. IEEE Micro, Authors: Val Popescu, Merle Schultz, John Spracklen, Gary Gibson, Bruce Lightner, David Isaman.

PowerPC 603: RISC Microprocessor User's Manual, 1994, chapter 10.

Pentium Processor User's Manual, vol. 1: Pentium Processor Data Book, Intel Corp., 1993, chapter 6.

MC68030 Enhanced 32-Bit Microprocessor User's Manual, Second Edition, Motorola. Inc., 1989, chapters 6 and 7.

*Primary Examiner*—Robert W. Beausoliel, Jr.
*Assistant Examiner*—Norman M. Wright
*Attorney, Agent, or Firm*—Blakely, Sokoloff, Taylor & Zafman

[57] ABSTRACT

A number of data misalignment detection circuits are provided to select ones of an execution unit and memory order interface components, of an out-of-order (OOO) execution computer system, this aids the buffering and fault generation circuits of the memory order interface components, to buffer and dispatch load and store operations depending on if the misalignments are detected and their nature, resulting in load and store operations of misaligned data against a memory subsystem of the OOO execution computer system are available, the data addressed by the load and store operations are of the following types: chunk split, cache split, or page split misaligned.

52 Claims, 16 Drawing Sheets

METHOD AND APPARATUS FOR LOADING AND STORING MISALIGNED DATA ON AN OUT-OF-ORDER EXECUTION COMPUTER SYSTEM

This is a continuation of application Ser. No. 08/202,445, filed Feb. 28, 1994, now abandoned.

BACKGROUND OF THE INVENTION

1. Field of the Invention

The present invention relates to the field of computer systems. More specifically, the present invention relates to loading and storing misaligned data on an out-of-order execution computer system.

2. Background

Loading and storing misaligned data from and to a memory subsystem have been supported in prior art in-order execution computer systems. Data may be misaligned crossing two data chunks, or two cache lines, even two memory pages. The size of a data chunk, the size of a cache line, and the size of a memory page is architectural dependent. Additionally, the size of a cache line and the size of a memory page may be further dependent on the manner in which the computer system is configured.

Typically, hardware is provided to perform proper shifting or rotation for loading and storing data that cross two data chunks. Furthermore, hardware is provided to perform proper tracking and merging for loading and storing data that cross either two cache lines or two memory pages, with successive aligned subset loads and stores. Each of the successive aligned subset loads or stores involves data that are within the boundaries of a cache line. Data that are aligned within the boundaries of a cache line are automatically aligned within the boundaries of a memory page. A check is performed for each memory page for access permission, access mode, etc. Since instructions are executed in program order, there is no data synchronization problem.

However, in an out-of-order execution computer system, in order to maximize execution throughput, instructions are to be dispatched for execution as soon as their operand dependencies are resolved, without regard to program order or whether the instructions were speculatively or non-speculatively issued. Thus, it is desirable to be able to dispatch loads and stores to the memory subsystem as soon as their operand dependencies are resolved.

If data loads and stores are dispatched to the memory subsystem in such a manner, a dispatched data load or store in reality may or may not be ready to be executed by the memory subsystem due to incomplete predecessor data loads and/or stores. The reason is the memory subsystem typically requires a number of clock cycles to complete an actual data load or store and in the same period of time, multiple instructions could have dispatched. Additionally, while speculative data loads potentially can actually be executed by the memory subsystem, until the executed data loads become non-speculative, the speculatively loaded data must be "shielded" and not committed to a processor state, i.e. not making the data known and available to other processor components external to the out-of-order execution "core" such as a register file. On the other hand, speculative data stores can not be actually executed by the memory subsystem unless the destination memory locations are private to the processor and the memory subsystem has the ability to restore the overwritten data in the event the speculative data stores are purged. If either one of these conditions is not true, then the memory subsystem must actually execute the speculative data stores after they become non-speculative, also known to be ready to be committed to system state, i.e. making the data known and available to other system components external to the processor such as a coprocessor. In the meantime, to allow the out-of-order execution "core" to continue execution including subsequent speculative data loads, to the extent possible, the speculative data stores must be made to appear to have been executed to the out-of-order execution "core".

Thus, memory ordering interface circuitry is provided at either the "back end" of the out-of-order execution "core", in between the out-of-order execution "core" and the memory subsystem, the "front end" of the memory subsystem, or a combination thereof, to maintain memory order and thereby ensure data correctness. The order maintaining functions include at least the buffering of speculative and non-speculative data loads as well as non-speculative data stores until they can be actually executed by the memory subsystem, guaranteeing data correctness of speculatively executed data loads at the time of their commitment to processor states, and buffering speculative data stores until they become non-speculative.

Therefore, against this much more complex operating environment of an out-of-order execution computer system, loading and storing of misaligned data cannot be supported in the simplistic manner as the prior art in-order execution computer systems. Nevertheless, for compatibility reasons, it is still desirable if loading and storing of misaligned data can be supported, notwithstanding the much more complex operating environment. As will be disclosed, the method and apparatus of the present invention advantageously achieves the above discussed and other desired results.

SUMMARY OF THE INVENTION

Under the present invention, the desirable results are advantageously achieved, in one embodiment, by providing data chunk split misalignment detection circuitry to an address generation circuitry of an execution unit (EU) and buffering circuitry to memory order interface (MOI) components of an out-of-order (OOO) execution computer system. The data chunk split misalignment detection circuitry detects data chunk split misalignments for data load and store operations when the load and store operations are dispatched to a memory subsystem (MEM) of the computer system from a reservation station (RS) of the OOO execution computer system. The buffering circuitry buffers the load and store operations. For a load operation, the buffering circuitry dispatches the load operation to the MEM concurrent with committing the misaligned data of the load operation to a processor state by reordering circuitry of the OOO execution computer system if data chunk split misalignment is detected for the load operation. For a store operation, the buffering circuitry allows the misaligned data of the store operation to be promoted to a system commitment ready state by the reordering circuitry, and subsequently dispatches the store operation to the MEM with appropriate alignment adjustment information, if data chunk split misalignment is detected for the store operation.

Additionally, the MOI components are provided with cache line split misalignment detection circuitry for detecting cache line split misalignments for data chunk split misaligned load and store operations when the load and store operations are dispatched from the RS. For a cache line split misaligned load operation, the buffering circuitry further dispatches the cache line split misaligned load operation as successive aligned subset load operations, each destined for a subset of source memory locations that are data boundary aligned. For a cache line split misaligned store operation, the buffering circuitry further prevents the misaligned data of the cache line split misaligned store operation from being promoted to the system commitment ready state by the reordering circuitry, until the cache line split misaligned store operation can be dispatched to the MEM concurrently. The buffering circuitry then concurrently dispatches at commitment time the cache line split misaligned store operation as successive aligned subset store operations, each destined for a subset of destination memory locations that are data boundary aligned.

Furthermore, a data translation lookaside buffer (DTLB) of the MOI components is provided with fault generation circuitry including memory page split misalignment detection circuitry and forward fault detection function. The memory page split misalignment detection circuitry detects memory page split misalignment for a cache line split misaligned load/store operation when the first of its sequence of successive aligned subset load/store operations is dispatched by the buffering circuitry. The fault generation circuitry faults the first of the successive aligned subset load/store operations if memory page split misalignment is further detected. The forward fault detection function detects ahead for faults for memory pages to be referenced by the rest of the successive aligned subset load/store operations, if the first of these successive aligned subset load/store operations is faulted for memory page split misalignment. The fault generation circuitry further faults the first of these successive aligned subset load/store operations if fault is detected for any of these memory pages to be referenced.

BRIEF DESCRIPTION OF THE DRAWINGS

FIG. 5b also illustrates the store data buffer of the memory interface unit of FIG. 3a, and the physical address buffer of the data cache of FIG. 3b.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily. For ease of explanation, unless otherwise stated, the terms data load and store operations in the description to follow are intended to mean memory data load and store operations.

Figure 1A:
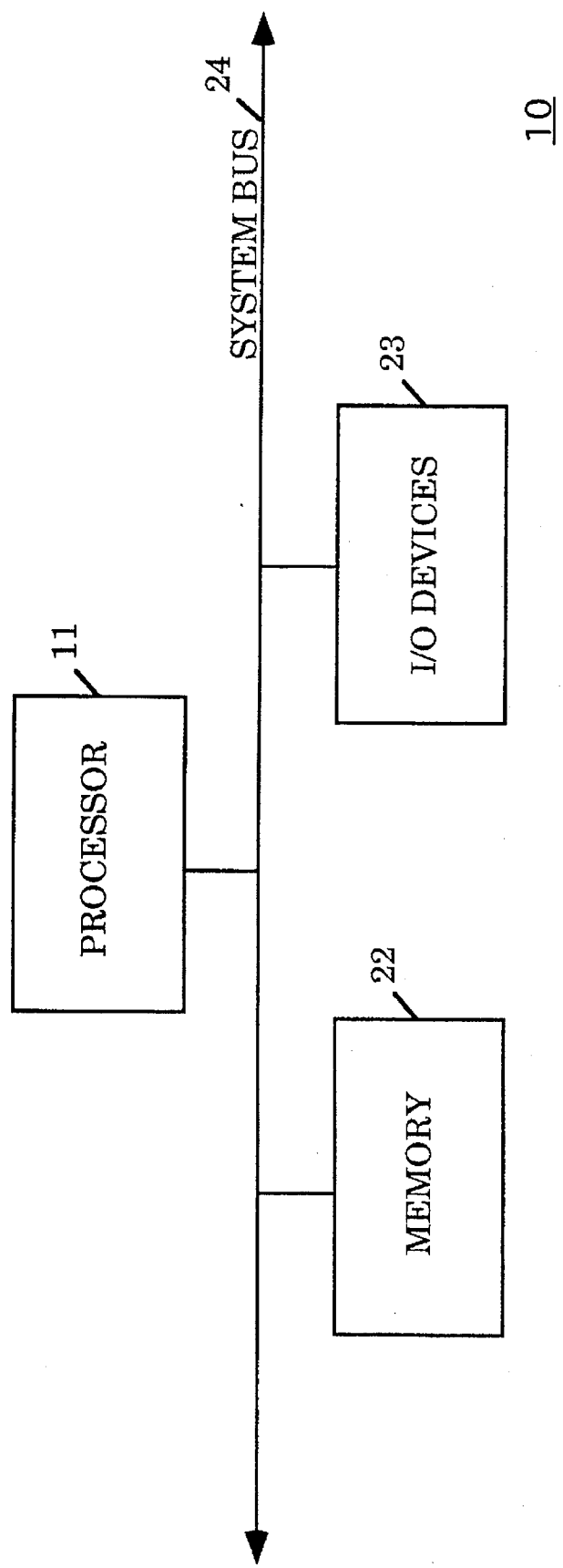
FIGS. 1a–1d illustrate an exemplary out-of-order execution computer system incorporating the teachings of the present invention, including addressing, data boundary misalignment, and data boundary misalignment encoding on the exemplary computer system.

Referring now to FIGS. 1a–1d, four block diagrams illustrating an exemplary out-of-order (OOO) execution computer system incorporating the teachings of the present invention are shown. Illustrated in FIG. 1a is the exemplary computer system 10 comprising an OOO execution processor 11, a memory unit 22, a number of I/O devices 23, and a system bus 24, coupled to each other as shown. As will be described in further detail below, the processor 11 comprises a memory execution unit (MEU) 15 having an internal data cache (DC) 20 (see FIGS. 2 & 3b). In the presently preferred embodiment, the processor 11 is disposed on a single silicon based chip. Notwithstanding the DC 20 as being illustrated as an integral part of the processor 11, for the purpose of this disclosure, the term memory subsystem includes the DC 20 as well as the memory unit 22.

Figure 1B:
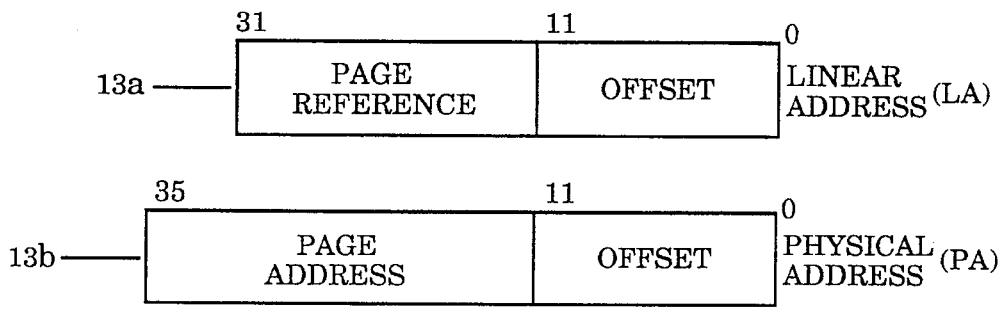

The exemplary computer system 10 supports virtual address spaces comprising memory locations of the memory unit 22 and the addresses of the I/O devices 23, which are partitioned into memory pages and organized into memory segments. During program execution, memory space locations are referenced by instructions, including load and store instructions, using linear addresses, which in turn get translated into physical addresses. A linear address is computed using a base address, a displacement value, a scale value, an index value, and a segment value. As illustrated in FIG. 1b, a linear address 13a comprises a translated portion which identifies a memory page, and an untranslated portion which identifies the offset into the memory page. Correspondingly, a physical address 13b comprises the translated portion of the linear address locating the memory page, and the untranslated portion of the linear address locating the offset into the memory page. In one embodiment, a linear address 13a is 32 bits long with the 20 higher order bits getting translated, and the 12 lower order bits untranslated. A physical address 13b is 36 bits long with the 24 higher order bits being the translated portion, and the 12 lower order bits being the untranslated portion of the linear address.

Figure 1C:
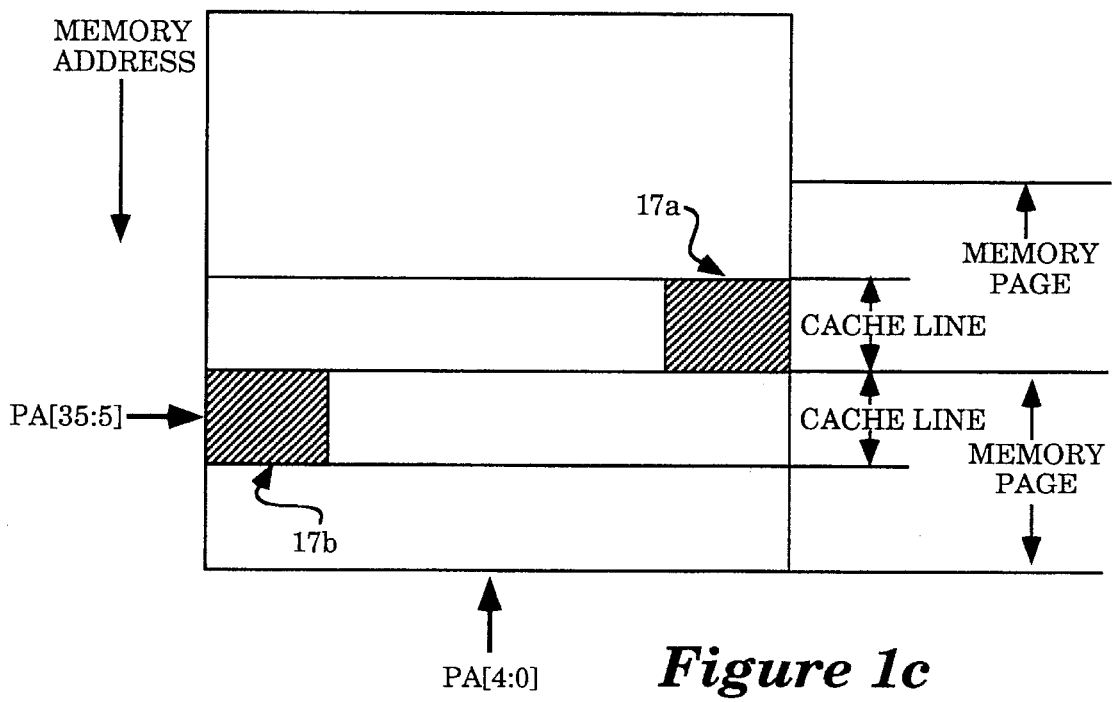

As illustrated in FIG. 1c, loading and storing data 17a and 17b from and to memory space locations are not required to be data boundary aligned. In other words, load and store data 17a and 17b may be split for example over two data chunks, two cache lines, as well as two memory pages. As illustrated, load and store data 17a and 17b that are memory page split misaligned are by definition cache line split misaligned. Similarly, load and store data 17a and 17b that are cache line split misaligned are by definition data chunk split misaligned. In one embodiment, a memory page is 4K bytes, a cache line is 32 bytes, and a data chunk is 8 bytes.

Figure 1D:
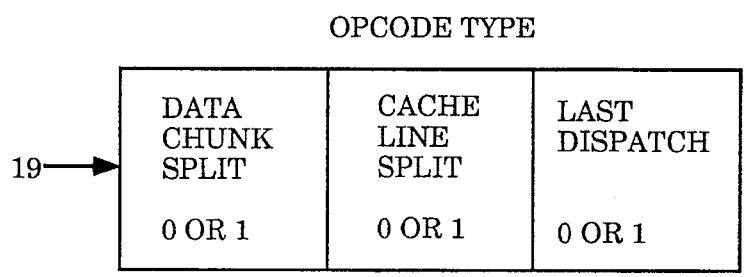

As illustrated in FIG. 1d, an opcode type 19 is used by each load or store instruction to encode two of the three types of data boundary misalignment. A first control bit of the opcode type 19 when set indicates that the load or store operation is data chunk split misaligned. A second control bit of the opcode type 19 when set indicates that the load or store operation is cache line split misaligned. In addition to these two control bits, the opcode type 19 further comprises a third control bit when set indicates that the load/store operation is the last of the successive aligned subset load/store operations for a cache line split misaligned load/store operation. In an embodiment where a load/store operation may at most split over two cache lines, the third control bit of the opcode type 19, when it is not set and the second control bit is set, further denotes that the aligned subset load/store operation is the first of two successive aligned subset load or store operations for a cache line split misaligned load or store operation.

Except for the teachings of the present invention incorporated in the processor 11, the elements 11, 23–24, are intended to represent a broad category of processors, memory units, I/O devices, and system buses found on many computer systems. Their basic functions and constitutions are well known, thus will not be otherwise further described. The teachings of the present invention incorporated in the processor 11 for performing loading and storing of misaligned data against the memory subsystem, including the determination of data boundary misalignment and dispatching of successive aligned subset load/store operations for a cache line/memory page split misaligned load/store operation, will be described in further detail below with additional references to the remaining figures.

While for ease of understanding, the present invention is being described with the exemplary computer system 10 illustrated in FIGS. 1a–1d, based on the description to follow, it will be appreciated that the present invention may be practiced on other OOO execution computer systems configured in other manners, having different addressing mechanisms, and/or different data boundary alignments. Furthermore, the functions of the OOO execution processor 11 may be disposed on one or more chips, fabricated using silicon or other equivalent semiconductor materials.

Figure 2:
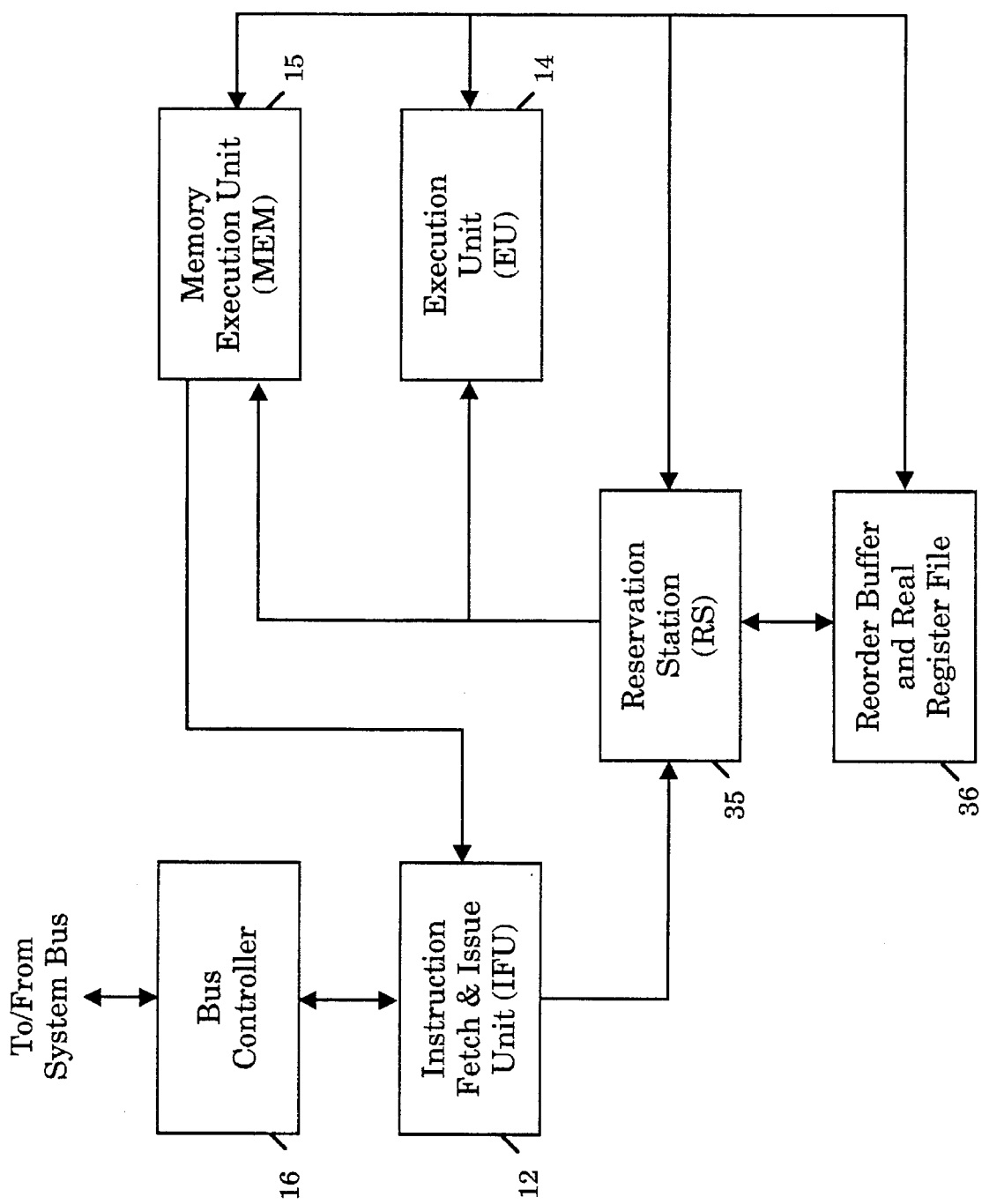
FIG. 2 illustrates the relevant portions of one embodiment of the out-of-order execution processor of FIG. 1 a in further detail.
Figure 3A:
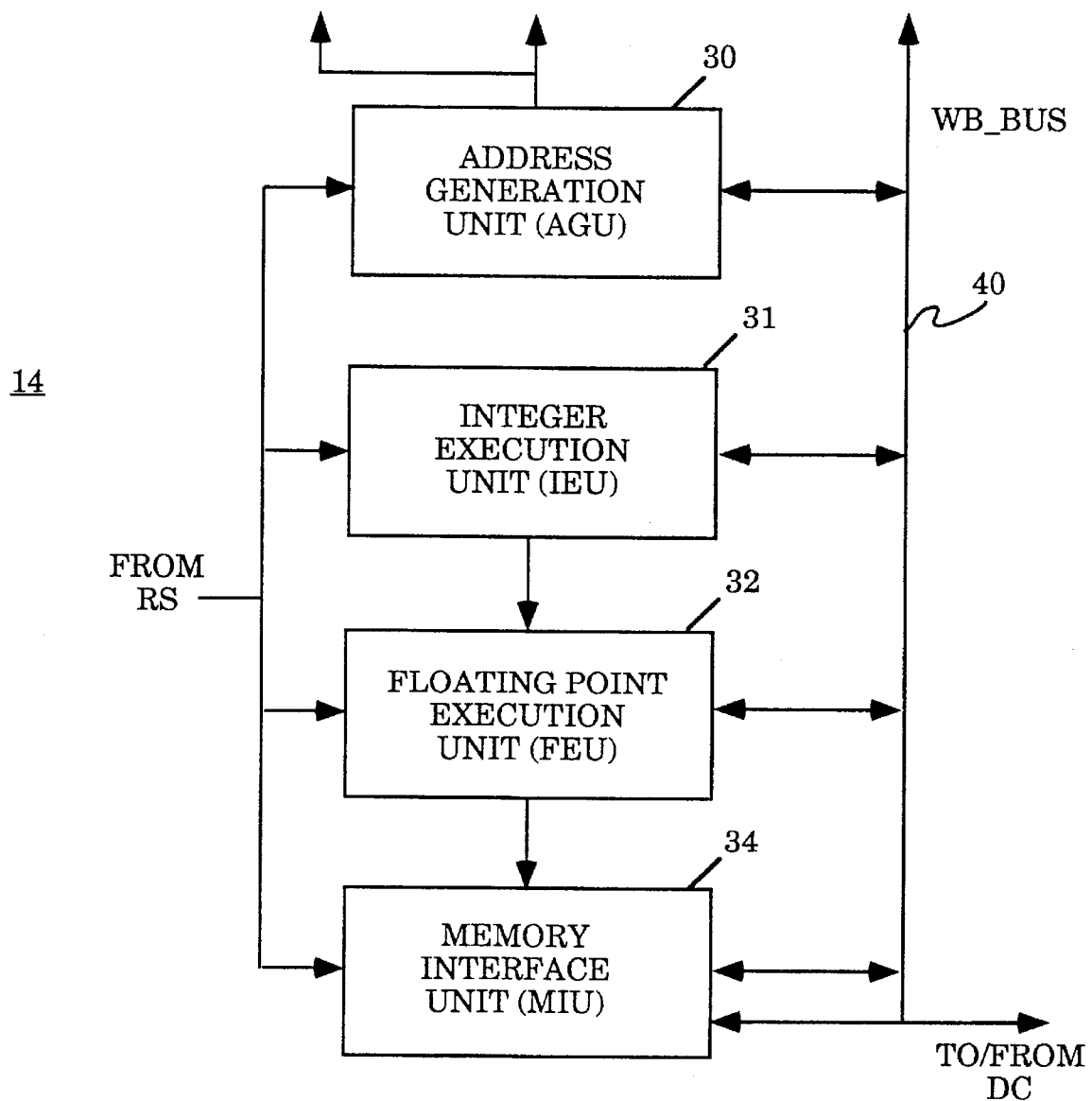
FIGS. 3a–3b illustrates the relevant portions of one embodiment of the execution unit and one embodiment of the memory execution unit of FIG. 2 in further detail.
Figure 3B:
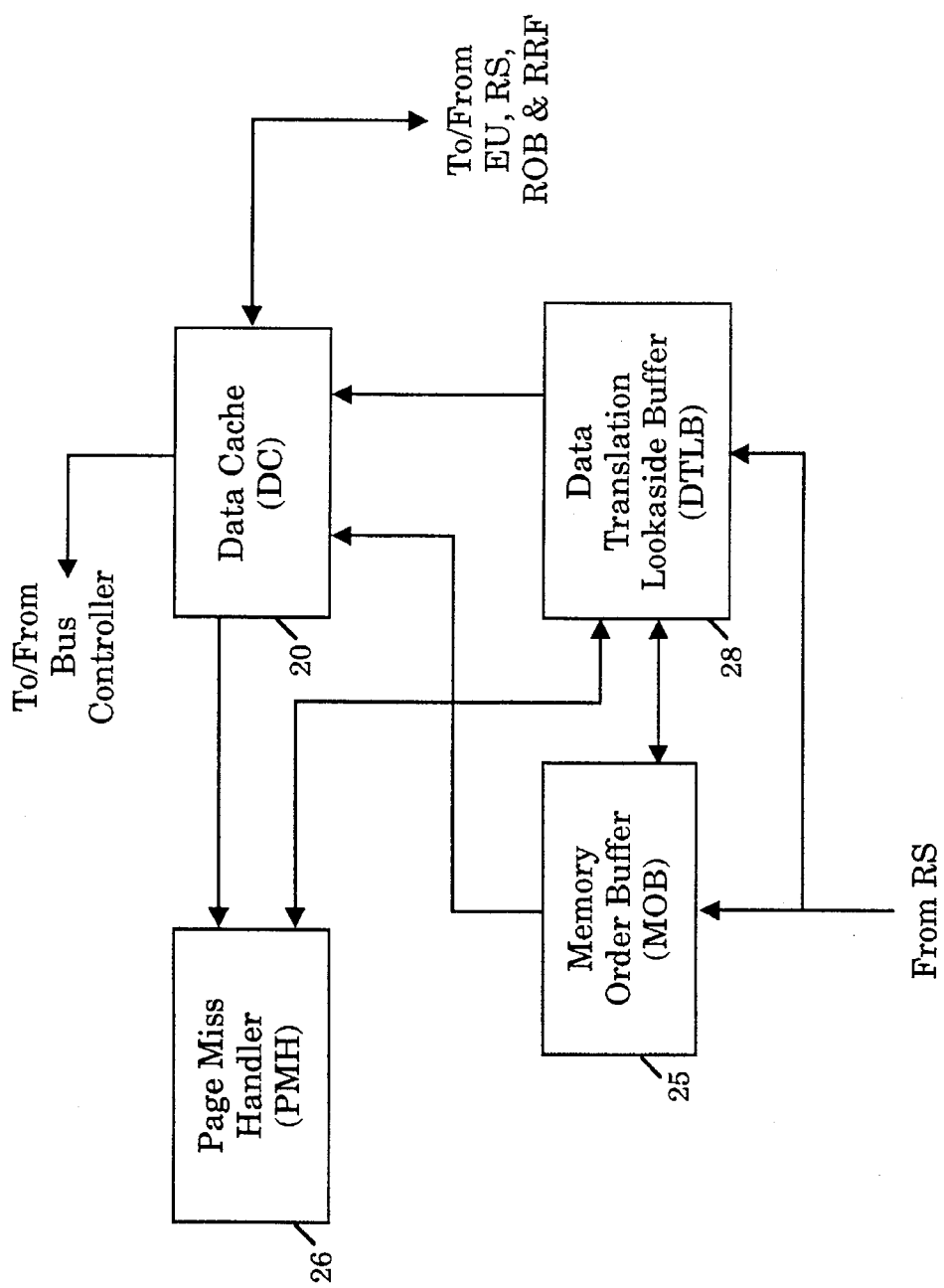

Referring now to FIGS. 2, and 3a–3b, three block diagrams illustrating the OOO execution processor 11 of FIG. 1a in further detail are shown. As illustrated in FIG. 2, the processor 11 comprises an instruction fetch and issue unit (IFU) 12, an execution unit (EU) 14, a memory execution unit (MEU) 15, a bus controller 16, a reservation station (RS) 35, and a reorder buffer (ROB) and real register file (RRF) 36, coupled to each other as shown. The IFU 12 includes an instruction cache and an instruction lookaside buffer (ITLB) (not shown), whereas the ROB and RRF 36 includes reordering circuitry (not shown). As illustrated in FIG. 3a, the EU 14 comprises an address generation unit (AGU) 30, an integer execution unit (IEU) 31, a floating point execution unit (FEU) 32, and a memory interface unit (MIU) 34, coupled to each other as shown. As illustrated in FIG. 3b, the MEU 15 comprises a data translation lookaside buffer (DTLB) 28, a page miss handler (PMH) 26, a memory order buffer (MOB) 25, and a DC 20, coupled to each other as shown. Together these elements cooperate to fetch, issue, execute, and save execution results of instructions in a pipelined manner.

The IFU 12 fetches instructions from the memory unit 22 through the bus controller 16 and the system bus 24, stores them in the instruction cache, and issues them in program order to the RS 35. Some instructions are fetched and issued speculatively. The RS 35 dispatches the instructions to the EU 14 and the MEU 15 for execution as soon as their operand dependencies on execution results of preceding instructions are resolved, including those instructions that are speculatively fetched and issued. The execution results are held in either the ROB 36, the MIU 34 of EU 14 or the MOB 25 of MEU 15, and in due course, either purged upon detection of mispredicted branches, saved into the RRF, committing the execution results to processor states, or written back into the MEM, committing the execution results to system states. In other words, the instructions are not necessarily executed in the order they were issued, and some instructions are speculatively executed. However, the execution results are committed to processor/system states in order, and speculative execution results of mispredicted branches are purged. As discussed earlier, for the purpose of this disclosure, data in processor states means the data are valid and available to other order dependent processor components, such as the RRF, whereas data in system states means the data are valid and available to other order dependent system components, such as a coprocessor.

More specifically, upon receiving the issued instructions from the physically addressed instruction cache of the IFU 12, the RS 35 stores the issued instructions, resolving their operands with data from the IEU 31, the FEU 32, the DC 20, the ROB and RRF 36, and hold them until their operands are all resolved. The RS 35 then dispatches the op codes, and the operands of the instructions to the AGU 30, the IEU 31, the FEU 32, the MIU 34, the MOB 25, and the DTLB 28 as appropriate. In particular, a load instruction is dispatched as a single load operation (LD) to the MOB 25, whereas a store instruction is dispatched as a store address (STA) and a store data (STD) operation, to the MOB 25, the DTLB 28 and the MIU 34. As described earlier, there is no requirement that the load sources or the store destinations be aligned memory locations, i.e., the load sources of load instructions and store destinations of store instructions may be split for example over two data chunks, two cache lines, as well as two memory pages (see FIG. 1c)

The AGU 30, the IEU 31, the FEU 32, the MIU 34, the MOB 25, and the DTLB 28 in turn perform their roles accordingly. In particular, the AGU 30 generates the linear addresses of the load and store operations for the MOB 25. As will be described in more detail below, the AGU 30 also detects whether a load or a store operation is data chunk split misaligned, and sets the first control bit in the opcode type of the load or store operation if the load or store operation is data chunk split misaligned. The MOB 25 buffers the LD and STA operations, maintaining memory order of the memory subsystem, thereby ensuring data correctness. As will be described in more detail below, the MOB 25 also detects whether a data chunk split misaligned load or a store operation is also cache line split misaligned, and sets the second control bit in the opcode type of the load or store operation if the data chunk split misaligned load or store operation is also cache line split misaligned. The MIU 34 executes the STD operations independent of the STA operations and whether the store operations are misaligned or not, buffers the store data of the STD operations.

In general, the MOB 25, in due course, unless purged, dispatches the buffered load and store operations to the DTLB 28 and the DC 20. The load operations are also dispatched to the MIU 34 for potential buffered store forwarding. The store operations are dispatched in concert with the MIU 34 after the store operations have been promoted to processor states or system commitment ready states. The store dispatches are performed in the "background" when the DC 20 is free, except when the MOB 25 is full. As will be described in more detail below, the MOB 25 adjusts the timing as well as the manner it dispatches the buffered load and store operations if the operations are data chunk and/or cache line split misaligned. The speculatively dispatched load and store operations of mispredicted branches held in the MOB 25 and the MIU 34 are purged upon their detections.

The DTLB 28 translates the linear addresses of the load and store operations into physical addresses for the DC 20. The DTLB 28 also provides memory types for the physical addresses, and performs a number of fault detections. As will be also described in more detail below, the DTLB 28 also detects whether a cache line split misaligned load or store operation is also memory page split misaligned. If the cache line split misaligned load or store operation is also memory page split misaligned, the DTLB 28 further performs forward page fault detections for the memory page split misaligned load or store operation.

The PMH 26 is used to handle page misses in both the ITLB and the DTLB 28, which includes among other functions, translation of page missed linear addresses into physical addresses, determination of memory types for the page missed physical addresses, and causing the allocation and filling of cache lines in the instruction cache of the IFU 12 and the DC 20.

The physically addressed DC 20 responds to load and store operations, returning load data for the load operations, and storing store data for store operations, committing the store data to system states. The load data and the execution results of the integer and floating point instructions are held in the ROB 36, and then in due course, unless purged, are stored into the RRF 36 in the order these instructions were issued under the control of the reordering circuitry of the ROB & RRF 36, committing the execution results to processor states. The speculative execution results of the mispredicted branches held in the ROB 36 are purged upon their detections.

The IFU 12, the bus controller 16, the IEU 31, and the FEU 32 are intended to represent a broad category of these elements found in many computer systems. Their functions and constitutions are well known and will not be further described. The RS 35, the ROB and RRF 36, and the PMH 26 are also intended to represent a broad category of these elements found in many computer systems, including but not limited to the RS and the ROB and RRF described in the copending U.S. patent application Ser. No. 08/174,074, entitled Method and Apparatus For Determining The Next Instruction Pointer In An Out-Of-Order Execution Computer System, filed on Dec. 22, 1993, and the PMH described in the copending U.S. patent application Ser. No. 08/171,528, entitled Method and Apparatus For Determining Memory Type By A Processor, filed on Dec. 22, 1993. Both copending applications are assigned to the assignee of the present invention, and are hereby fully incorporated by reference. The AGU 30, the MIU 34, the MOB 25, the DTLB 28, and the DC 20, in particular, the teachings of the present invention for performing loading and storing operations of misaligned data against the memory subsystem will be described in further detail below.

For a more detailed description of executing a store operation as two independent STA and STD operations, see copending U.S. patent application Ser. No. 08/177,250, entitled Method and Apparatus For Performing Store Operations, filed Jan. 4, 1994, and assigned to the assignee of the present invention, which is hereby fully incorporated by reference. For a more detailed description of forwarding buffered store data for load operations, see copending U.S. patent application Ser. No. 08/176,111, entitled Method and Apparatus For Forwarding Buffered Store Data In An Out-Of-Order Execution Computer System, filed on Dec. 30, 1993, assigned to the assignee of the present invention, which is also hereby fully incorporated by reference.

Figure 4:
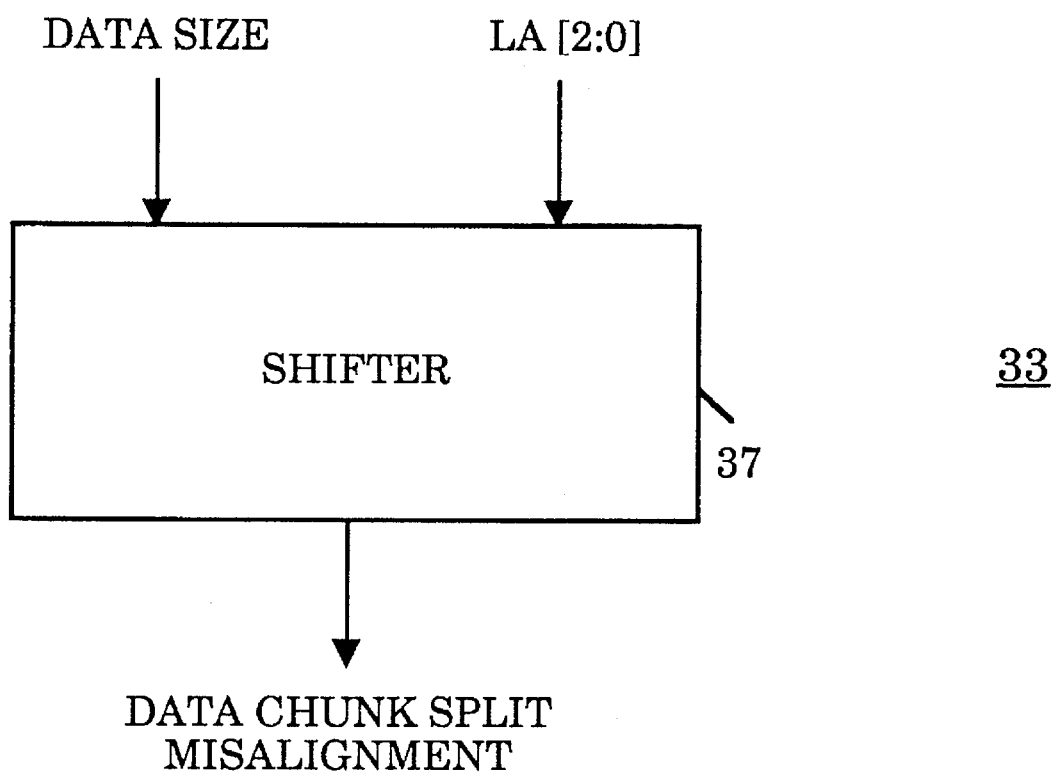
FIG. 4 illustrates the relevant portions of one embodiment of the data chunk split misalignment detection circuitry of the address generation unit of FIG. 3a in further detail.

Referring now to FIG. 4, a block diagram illustrating the relevant portions of one embodiment of the data chunk misalignment detection circuitry 33 of the AGU 30 of FIG. 3a in further detail is shown. As illustrated, the data chunk split misalignment detection circuitry 33 comprises a masked shifter 37. The masked shifter 37 receives the lower order bits of the linear address (LA[2:0]), and the data size of the load or store operation as inputs. In response, the masked shifter 37 generates a shift output. The shift output when set denotes that the load or store operation is data chunk split misaligned. The masked shifter 37 generates the shift output by shifting the received LA[2:0] of the load or store operation, in accordance to the received data size of the load or store operation.

Figure 5A:
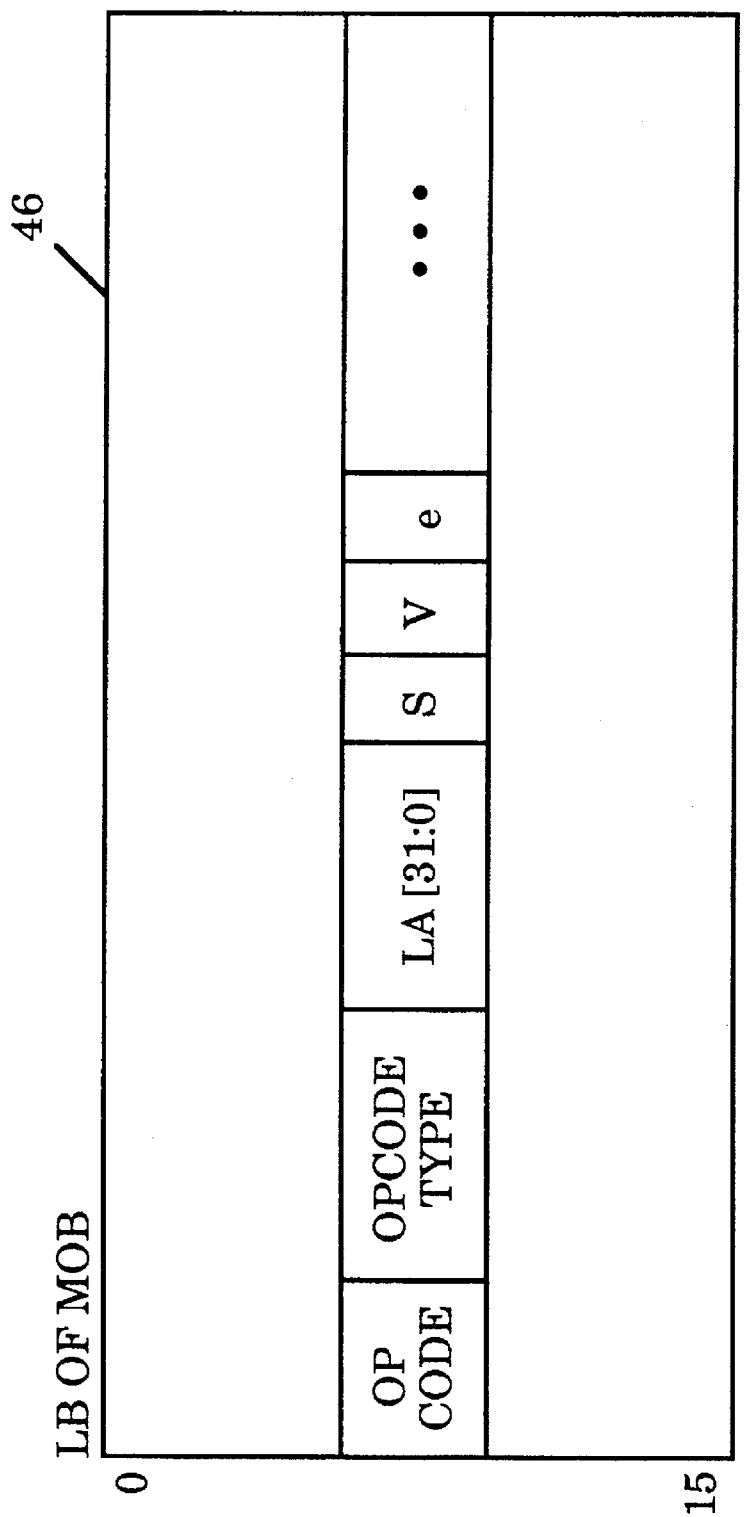
FIGS. 5a–5d illustrate the relevant portions of one embodiment of the memory order buffer of FIG. 3b in further detail, including the load buffer, the store address buffer, the cache line split misalignment detection circuitry, and the address and data size calculation circuitry of the memory order buffer.
Figure 5B:
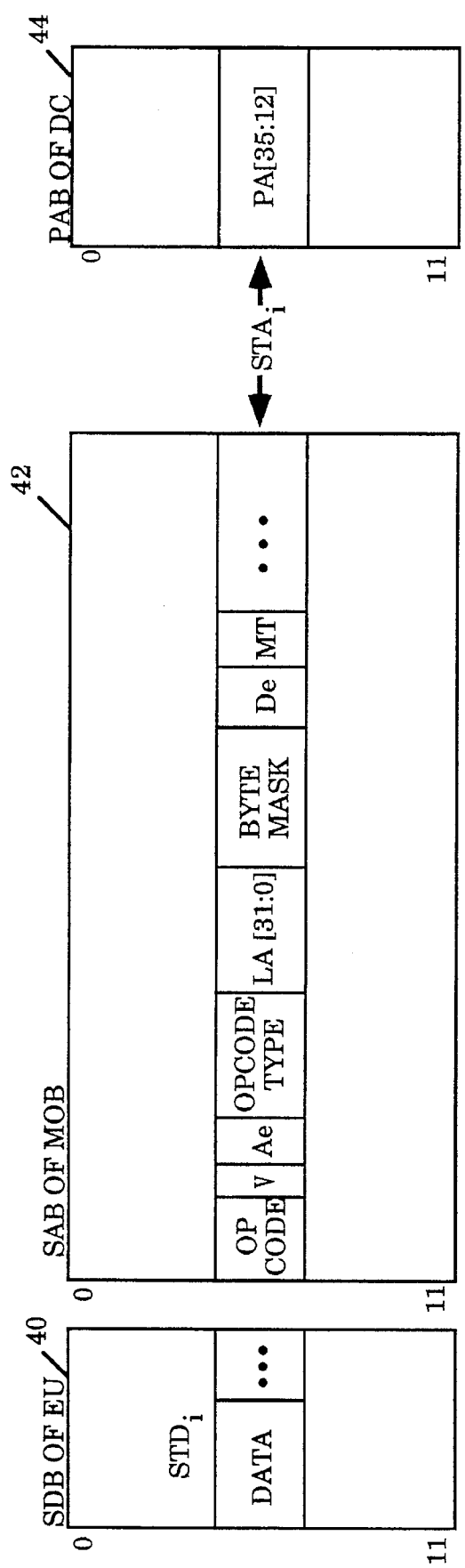

Referring now to FIGS. 5a–5d, four block diagrams illustrating relevant portions of one embodiment of the MOB 25 of FIG. 3b in further detail. FIG. 5b also illustrates complementary components of the MIU 34 of FIG. 3a, and the DC 20 of FIG. 3b. Illustrated in FIG. 5a is the load buffer (LB) 46 of the MOB 25 comprising a number of buffer slots for buffering the load operations dispatched by the RS 35. Each buffered load operation comprises its opcode, and linear address (LA[31:0]). Additionally, each buffered load operation also includes an opcode type, and a number of control bits including a valid bit (v) and an execution state (e) field.

The opcode, which is dispatched with the load operation by the RS 35, identifies the load operation and the size of the load operation. The linear address, which is also dispatched with the load operation, identifies the starting source memory location of the load operation. As described earlier, the opcode type comprises a number of control bits indicating whether the load operation is data chunk split misaligned, cache line split misaligned, and the last of the aligned subset load operations, which are set by the LB 46. The LB 46 sets the first control bit indicating whether the load operation is data chunk split misaligned based on the detection result of the data chunk misalignment detection circuitry 33 of the AGU 30. The setting of the other two opcode type control bits will be described in further detail below. The v-bit indicates whether the particular LB entry is valid, which is set by the LB 46 when allocating the buffer slot to the LB entry. The e-field indicates whether the particular load operation has been promoted to at least a speculatively executed state, which is set by the LB 46. The dispatching, executing, and consequently the setting of the e-field will be described in further detail below.

Illustrated in FIG. 5b is the store address buffer (SAB) 42 of the MOB 25. Illustrated also are the complementary store data buffer (SDB) 40 of the MIU 34, and the physical address buffer (PAB) 44 of the DC 20. The SDB 40, the SAB 42, and the PAB 44, all comprise equal number of corresponding buffer slots for storing the independently executed STD and STA operations of the store instructions. The STD operations are buffered in the SDB 40, whereas the STA operations are buffered in part in the SAB 42 and in part in the PAB 44. Each STD operation comprises its store data, whereas each STA operation comprises its opcode, linear address (LA[31:0]), physical address (LA[35:12]), and a byte mask. Additionally, each STA entry further comprises an opcode type, and a number of control and state bits including a valid bit (v), a STA execution state field (Ae), and a STD execution state field (De).

The opcode, which is dispatched with the store operation by the RS 35, identifies the store operation and the size of the store operation. The linear address, which is also dispatched with the store operation, identifies the starting destination memory location of the store operation. The physical address as described earlier is provided by the DTLB 28. The MT, which as explained in more detail below is subsequently provided by the PMH 26, identifies the memory type of the destination memory locations. The store byte mask provides for data alignment and byte access checking of store operations against load operations, which is calculated by the SAB 42 in any one of the manners known in the art. The opcode type indicates whether the store operation is data chunk split misaligned, cache line split misaligned, and the last of the aligned subset store operations, which is set by the SAB 42. The SAB 42 sets the first control bit indicating whether the store operation is data chunk split misaligned based on the detection result of the data chunk misalignment detection circuitry 33 of the AGU 30. The setting of the other two opcode type control bits will be described in further detail below. The v-bit indicates whether the particular SAB entry is valid, which is set by the SAB 42 when allocating the buffer slot to the SAB entry. The Ae-field and the De-field indicate whether the respective STA or STD operation has been promoted to at least a speculatively executed state, i.e. speculatively executed or retirement ready, which are set by the SAB 42 in concert with the MIU 34. The dispatching, executing, and consequently the setting of the Ae-field and the De-field will be described in further detail below.

Figure 5C:
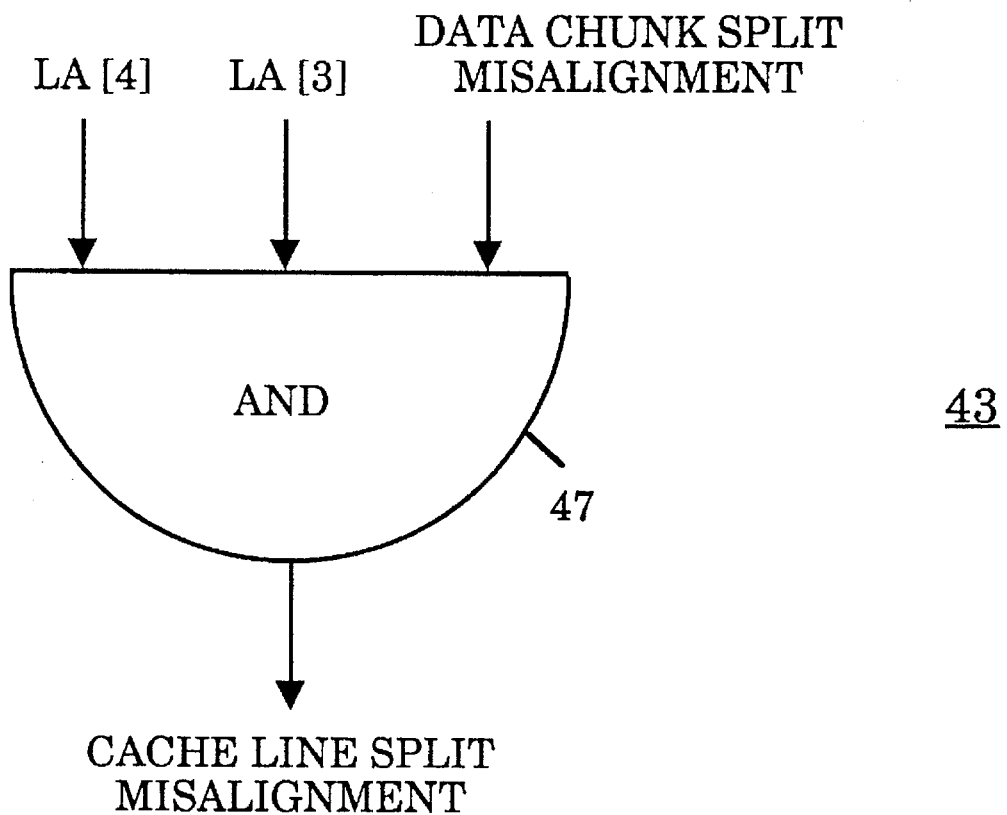

Additionally, as illustrated in FIG. 5c, each of the LB 46 as well as the SAB 42 includes a cache line split misalignment detection circuitry 43 for detecting cache line split misalignment for a load or store operation. In the illustrated embodiment, the cache line split misalignment detection circuitry 43 comprises an AND gate 47. The AND gate 47 receives the data chunk split misalignment signal, and LA[4:3] of the load or store operation as inputs. The AND gate 47 generates the logical AND of its inputs as output. The output when set denotes the data chunk split misaligned load or store operation is also cache line split misaligned.

Figure 5D:
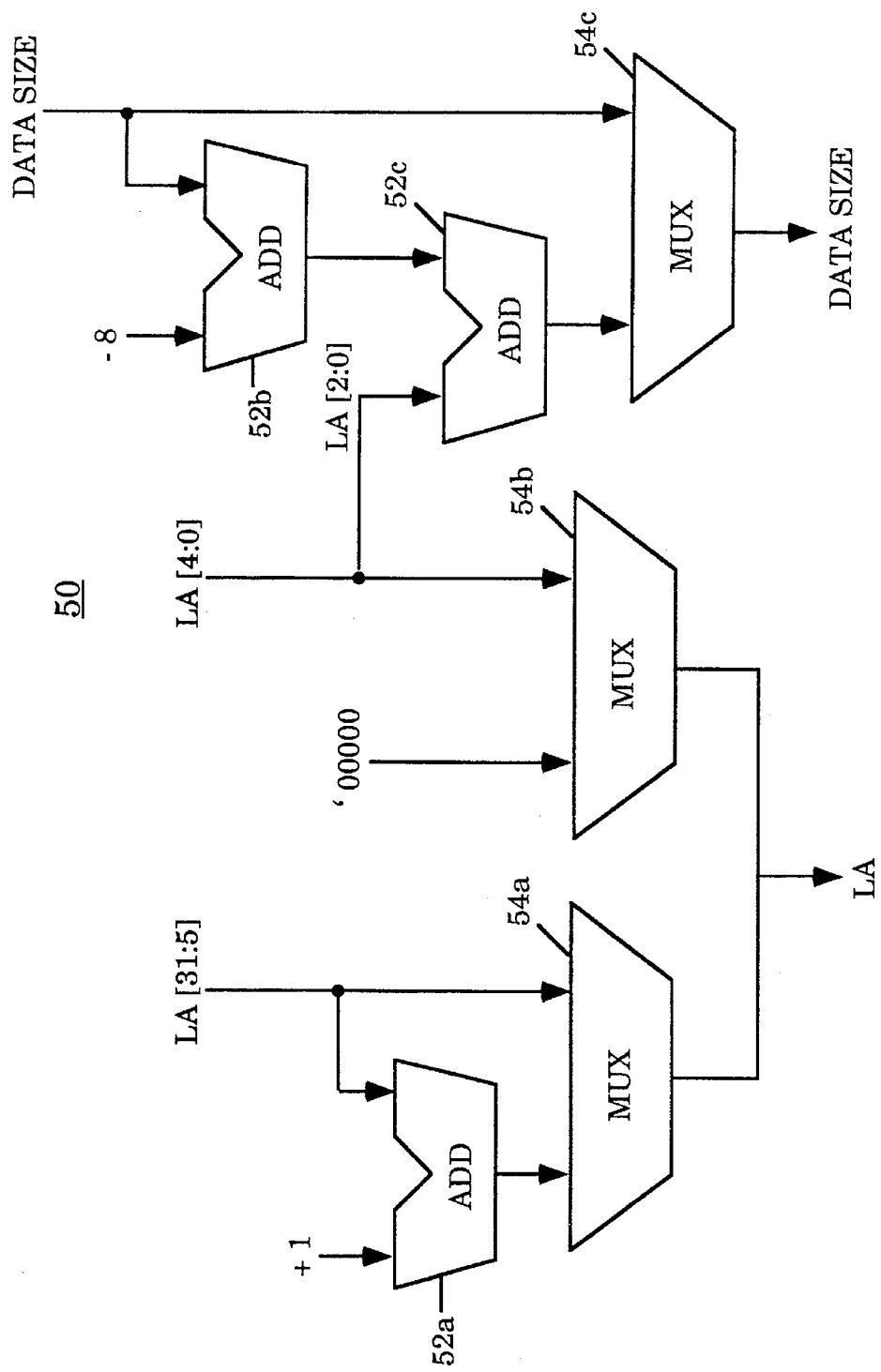

Furthermore, as illustrated in FIG. 5d, each of the LB 46 as well as the SAB 42 includes an address and data size calculation circuitry 50 for generating addresses and data sizes for the successive aligned subset load/store operations for a cache line split misaligned load/store operation. Illustrated in FIG. 5d is an embodiment for generating the addresses and data sizes of the first and second aligned subset load/store operations of a two cache lines split misaligned load/store operation. In this embodiment, the address and data size calculation circuitry 50 comprises a number of adders 52a–52c and a number of multiplexors 54a–54c. The first adder 52a generates the upper portion of the linear address (LA[31:5]) of the second aligned subset load/store operation by adding the value one to LA[31:5]. The second and third adders 52b generate the data size of the second aligned subset load/store operation by subtracting the decimal value 8 from the data size and then adding the subtraction result to appropriate lower order bits of the linear address (LA[2:0]). The first and second multiplexors 54a–54b select LA[31:5] and LA[4:0] for the first aligned subset load/store operation, and the incremented LA[31:5] and '00000 for the second aligned subset load/store operation. The third multiplexor 54c selects the original data size for the first aligned subset load/store operation, and the decremented data size for the second aligned subset load/store operation.

If a load operation is not misaligned, the LB 46 dispatches the load operation in due course to the DC 20 through the DTLB 28, and promotes the load operation to a speculatively executed state or processor commitment ready state after the return of the data being loaded to the ROB and RRF 36, depending on whether the load operation was speculatively dispatched from the RS 35 or not. For those speculatively executed load operations, in due course, after the load has become non-speculative (when the speculative taken branch was determined to be actually taken or no prior exceptions), the LB 46 promotes the load operation to the processor commitment ready state. The LB 46 in cooperation with the reordering circuitry of the ROB and RRF 36 then retires the load operations in program order, and purges the retired load operations from the LB 46.

However, if a load operation is data chunk split misaligned, indicated by the setting of the first control bit of the opcode type, the LB 46 holds the load operation until the reordering circuitry of the ROB and RRF 36 indicates that execution results of the held load operation would be committable to processor state. The ROB and RRF 36 so indicates when all operations older than the held load operation have been committed to processor states. The LB 46 then dispatches the previously held load operation to the DC 20 through the DTLB 28 and in cooperation with the ROB and RRF 36 commits the return data concurrently.

Additionally, if a load operation is cache line split misaligned, indicated by the setting of the second control bit of the opcode type, the LB 46 further dispatches the previously held misaligned load operation as successive aligned subset load operations. The LB 46 dispatches the first aligned subset load operation without setting the third control bit of the opcode type. The LB 46 dispatches the last aligned subset load operation with the third control bit of the opcode type set. As described earlier, a subsequent aligned subset load operation is dispatched with appropriately incremented address and decremented data sizes. As will be obvious from the descriptions to follow, the LB 46 does not have to perform any special handling for a memory page split misaligned load operation.

If a store operation is not misaligned or merely data chunk split misaligned, unless it is an ineligible store operation such as storing data to memory locations mapped to I/O devices, the reordering circuitry of the ROB and RRF 36 in due course promote the buffered STD and STA operations of the store operation to system commitment ready state. The MIU 34 and the SAB 42 then in due course dispatch the system commitment ready STD and STA operations to the data cache 20 in the "background", when the data cache 20 is free, and purge them from the SDB 30 and the SAB 32. Upon writing the store data, the DC 20 also purges the corresponding partial STA entry in the PAB 34.

However, if a store operation is cache line split misaligned, indicated by the setting of the second control bit of the opcode type, the SAB 42 in concert with the MIU 34 further dispatch the previously held misaligned store operation as successive aligned subset store operations. The SAB 42 dispatches the first aligned subset STA operation without setting the third control bit of the opcode type. The SAB 42 dispatches the last aligned subset STA operation with the third control bit of the opcode type set. As described earlier, a subsequent aligned subset store operation is dispatched with appropriately incremented address and decremented data sizes. The MIU 34 provides the appropriate subset store data for each of the aligned subset store operations. As will be also obvious from the descriptions to follow, the SAB 42 and the MIU 34 do not have to perform any special handling for a memory page split misaligned store operation.

While the present invention is being described with a store operation being dispatched as a STD and a STA operation, and the store operands are buffered in separate buffers disposed in different components of the system, based on the descriptions to follow, it will be appreciated that the present invention may be practiced with the store operation being dispatched as one or more operations, and with the store operands being buffered in one or more buffers.

Figure 6A:
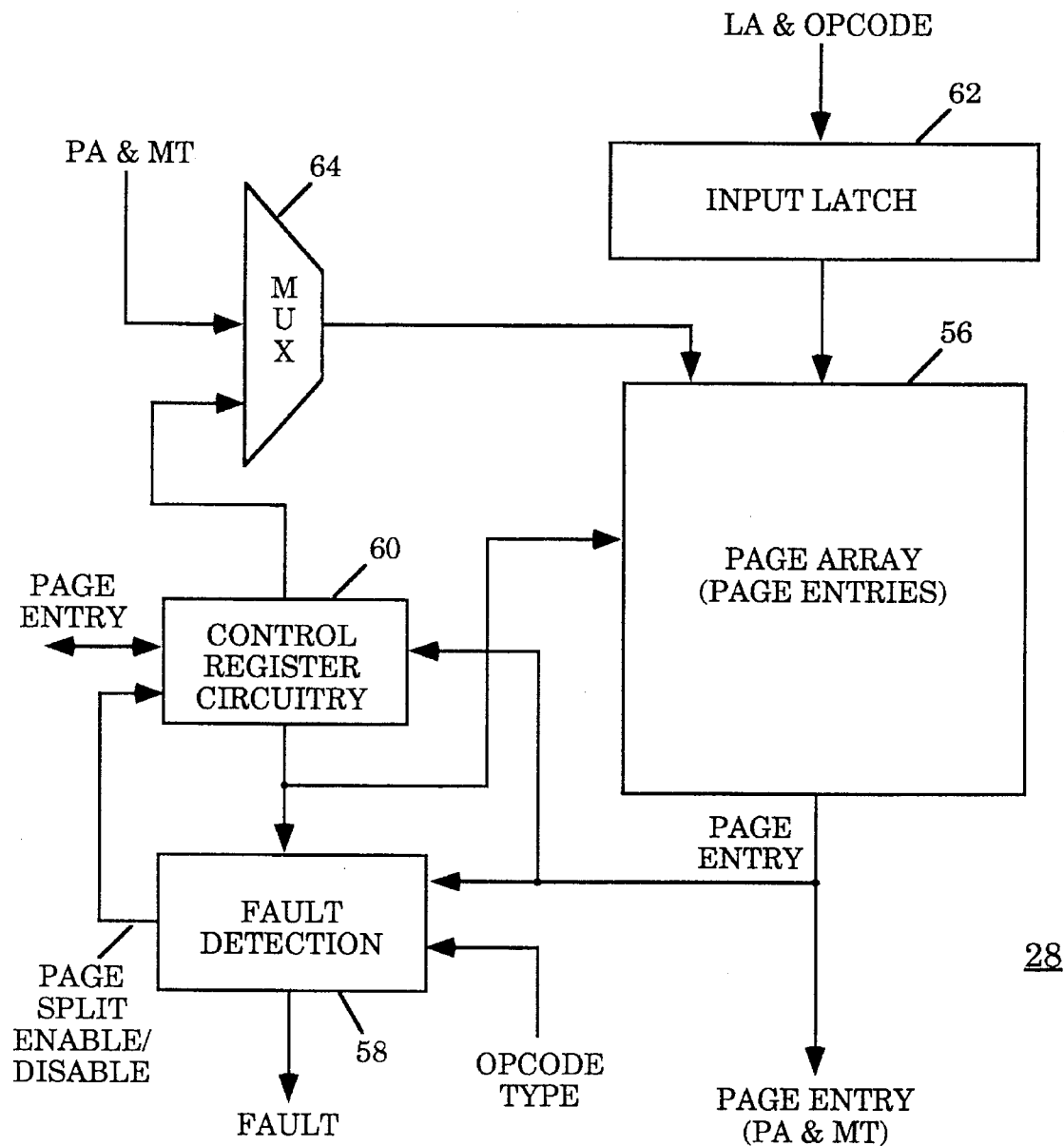
FIGS. 6a–6c illustrate the relevant portions of one embodiment of the data translation lookaside buffer of FIG. 3b in further detail, including the fault detection circuitry, and its memory page split misalignment detection circuitry and forward fault detection function.
Figure 6B:
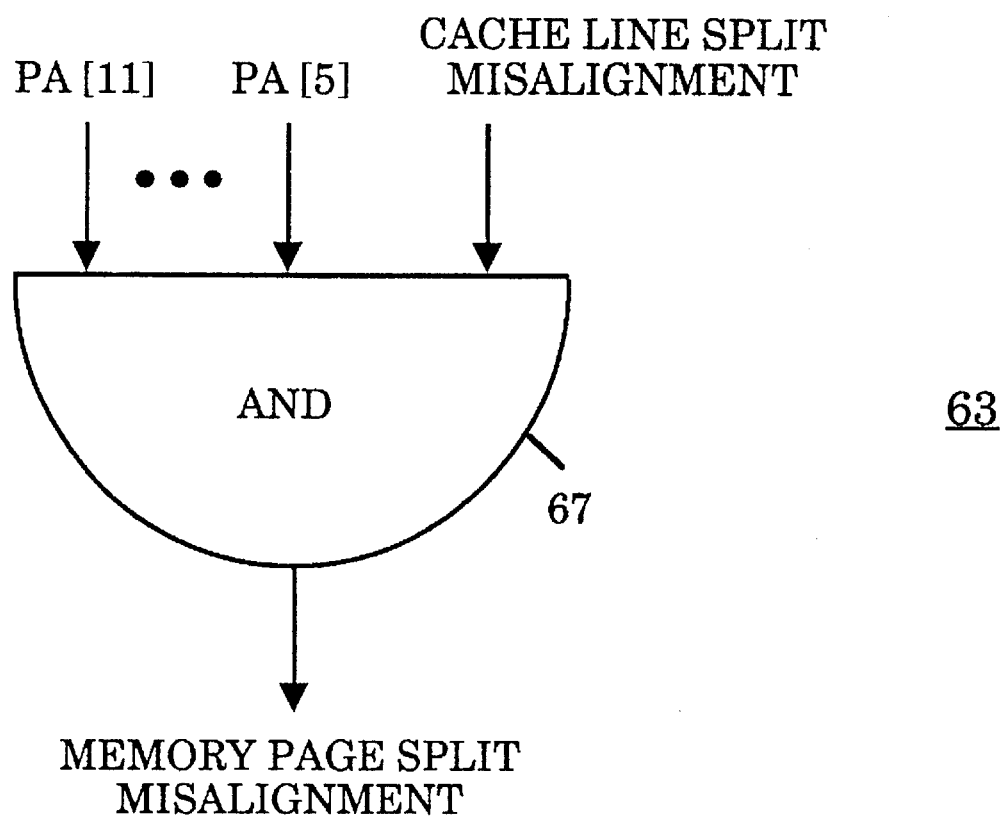
Figure 6C:
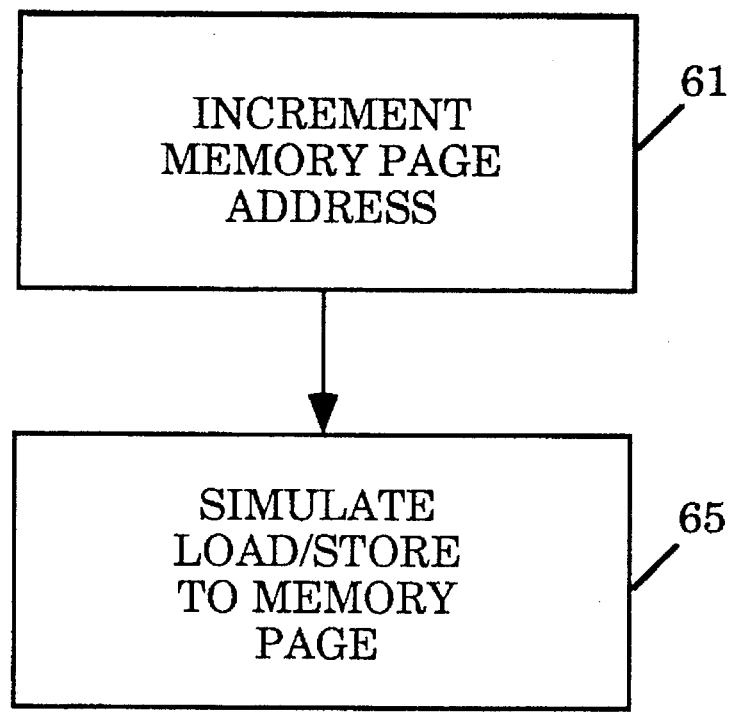

Referring now to FIGS. 6a–6c, three block diagram illustrating the relevant portions of one embodiment of the DTLB 28 of FIG. 3b in further detail are shown, including the fault detection circuitry's memory page misalignment detection circuitry and forward fault detection function. Illustrated in FIG. 6a is an embodiment of the DTLB 28 comprising a page array 56, fault detection circuitry 58, control register and circuitry 60, an input latch 62, and an input MUX 64, coupled to each other as shown. Together, they perform linear to physical address translation and a number of fault detections.

The page array 56 stores page entries for memory pages that are currently cached in the DTLB 28. Each page entries contains the translated portions of the corresponding linear and physical addresses, a memory type identifier, and a number of control indicators, for one of the memory pages. Each page entry is first written into the control registers of the control register circuitry 60, and then into the page array 56 through the input MUX 64. The input MUX 64 allows the physical address and the memory type provided by the PMH 26 to be used instead. In response to linear address and opcode received through the input latch 62, the page array 56 selects a page entry and outputs its content for the fault detection circuitry 58 and the control register circuitry 60, if there is a page hit. The translated physical address and the memory type of the selected page entry are also output for the MOB 25 or the DC 20. Alternatively, the page array 56 outputs a page miss for the MOB 25 or the DC 20, if a page miss is encountered.

The fault detection circuitry 58 performs a number of fault detections for the selected page entry being read out of the page array 56, as well as for a page entry being written into the page array 56. In particular, the fault detection circuitry 58 detects memory page split misalignment and outputs a fault signal for the MOB 25 and the DC 20. The fault signal blocks the load/store operation from being forwarded onward to the DC 20.

As illustrated in FIG. 6b, the fault detection circuitry 58 includes cache line split misalignment detection circuitry 63 comprising an AND gate 67. The AND gate 67 receives the cache line split misalignment signal and LA[11:5] of the load or store operation as inputs. The AND gate 67 generates the logical AND of its inputs as output. The output when set denotes that the cache line split misaligned load or store operation is also memory page split misaligned.

The fault detection circuitry 44 performs the memory page split misalignment detection when encountering the first of successive aligned subset load/operations dispatched by the MOB 25 for a cache line split misaligned load/store operation. The fault detection circuitry 44 recognizes the first of successive aligned subset load/operations dispatched for a cache line split misaligned load/store operation through the set second control bit and unset third control bit of the opcode type of the load/store operation.

Additionally, the fault detection circuitry 44 with assistance of microcode detects ahead for faults for a number of memory pages and outputs fault signals for these memory pages if references to these memory pages will result in faults. The microcode simulates accesses to these memory pages without actually causing accesses to the DC 20 to be made. As illustrated in FIG. 6c, the microcode increments the memory page address, step 61 before simulating an access to the memory page, step 63. If a page miss is encountered during the simulation, the page miss will cause the page to be brought into the memory subsystem just like any normal page miss encountered. In one embodiment, the microcode is disposed in the EU 14. These forward fault detections are performed when the memory page split misalignment detection circuitry 63 detects memory page split misalignment, when encountering the first of successive aligned subset load/store operations for a cache line split misaligned load/store operation. The memory pages checked are those that will be referenced by the successive aligned subset load/store operations.

The control register circuitry 60 stores a page entry being read out or written into the page array 56 and its associated control information. In particular, the control register circuitry 60 stores a control bit enabling or disabling the performance of page split misalignment detection.

As described earlier, the fault signal generated as a result of the memory page split misalignment detection blocks the first of the successive aligned subset load/store operations from being forwarded onward to the DC 20. If no faults were detected for the memory pages to be referenced from the forward fault detection, the blocking of the first aligned subset load/store operation causes the LB 46 or the SAB 42 in concert with the MIU 34 to re-dispatch the successive aligned subset load/store operations. However, disabling of the page split misalignment detection prevents the redispatched first aligned subset load/store operation to be faulted and blocked again. As a result, the initial blocking prepares the memory subsystem for the memory page split misaligned load/store operation, which is then subsequent performed through the redispatches of the aligned subset load/store operations.

Figure 7:
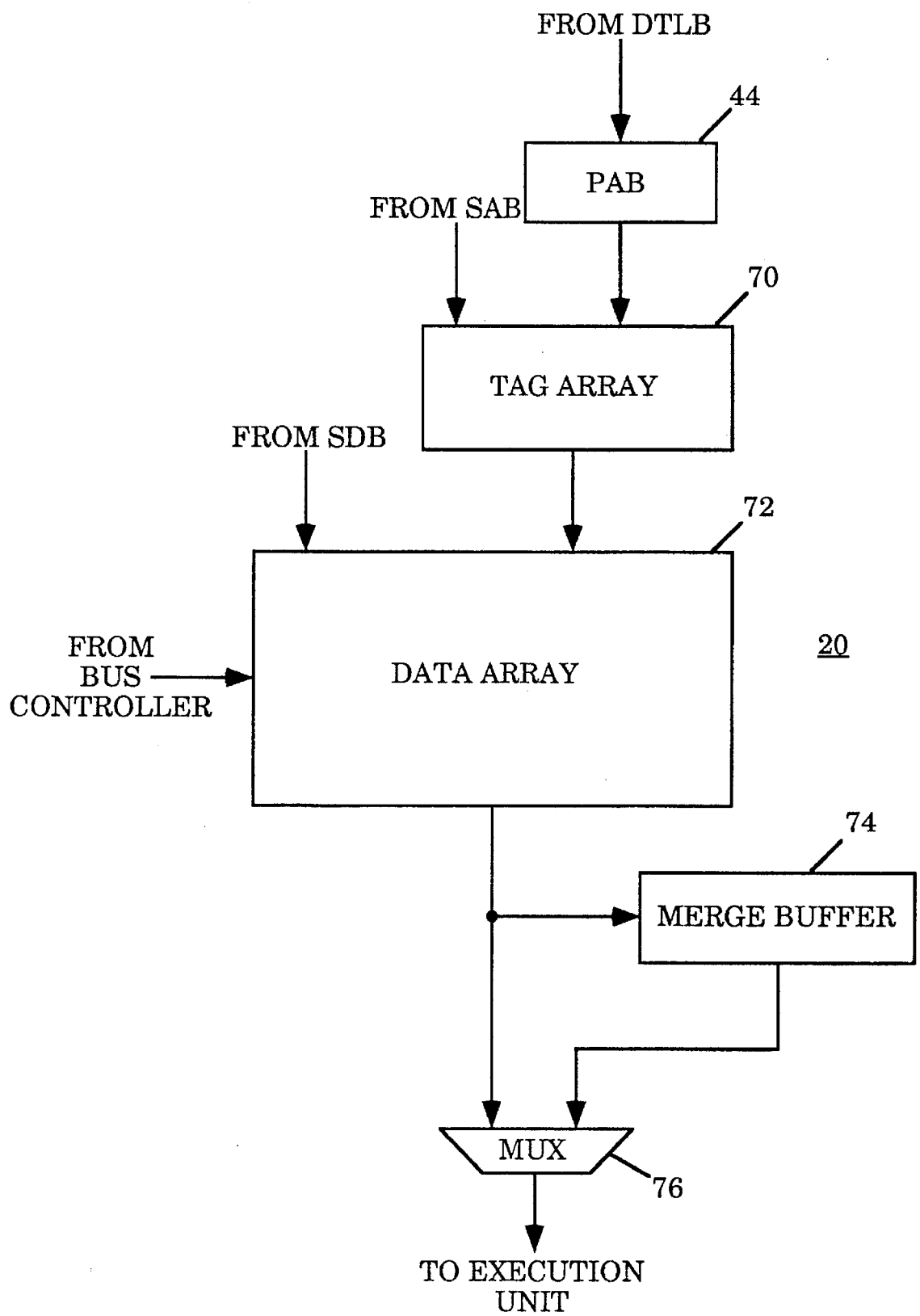
FIG. 7 illustrates the relevant portions of one embodiment of the data cache of FIG. 3b in further detail, including the merge buffer for merging aligned subsets of cache line/memory page split misaligned load data.

Referring now to FIG. 7, a block diagram illustrating the relevant portions of one embodiment of the DC 20 of FIG. 3b in further detail is shown. In this embodiment, the DC 20 comprises the PAB 44 described earlier, a data tag array 70, a data array 72, and a merge buffer 74, coupled to each other as shown. In one embodiment, the data tag array 70 and the data array 72 have sufficient capacity for storing 128 sets of 2 way set associative 32 byte cache lines of data and their corresponding address tags.

The PAB 44 receives and saves the 24 high order bits of the translated physical addresses from the DTLB 28 for the STA operations, and in cooperation with the SAB 42 and SDB 40, retires/commits and executes them as appropriate. When a pair of STA and STD operation is dispatched from the MOB 25 and the MIU 34 concurrent with committing the store data to system state, i.e. dispatched at retirement, the PA from the DTLB 28 is used in lieu of reading it from the PAB 44. The data tag array 70 stores the physical address tags of the data currently being cached in the data array and tag matches the accessing physical addresses against the stored physical address tags. The data array 72 receives and stores the data currently being cached, and responds to data loads. The PAB 58, the tag array 60 and the data array 62 are intended to represent a broad category of these elements found in most computer systems, whose functions and constitutions are well known and will not be further described.

The merge buffer 74 receives and merges the load data read out of the data array 72 in response to successive aligned subset load operations for a cache line/memory page split misaligned load operation. The DC 20 recognizes the first and last of the successive aligned subset load operations for a cache line/memory page split misaligned through the settings of the second and third control bits of the opcode type of the misaligned load operation. As described earlier, the LB 46 dispatches the first of the successive aligned subset load operation for a cache line/memory page split misaligned load operation with the original data size. The DC 20 ignores this original data size, and simply reads out the data from the starting address to the end of the cache line.

Figure 8A:
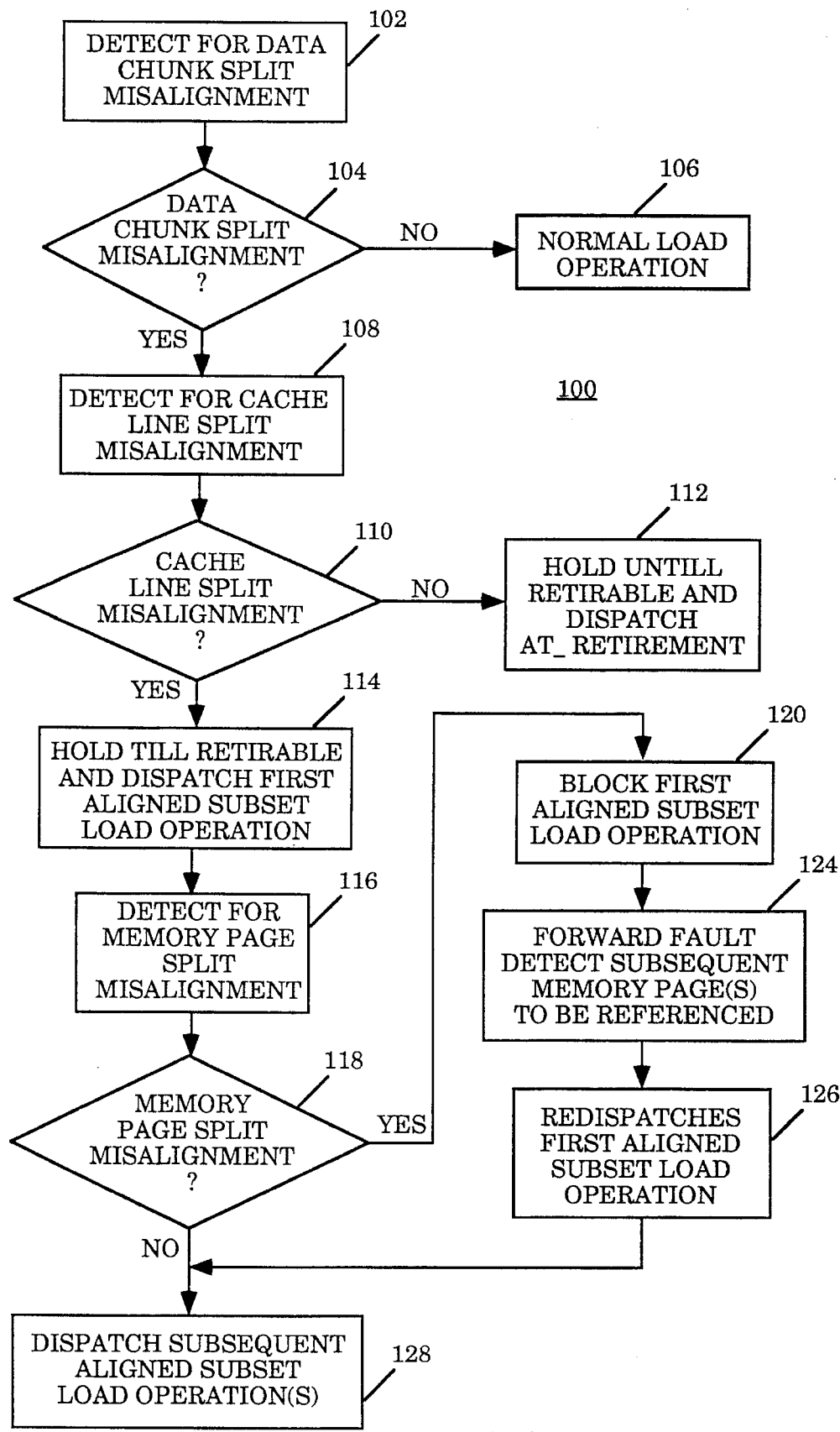
FIGS. 8a and 8b summarize the method steps of the present invention for performing loading and storing of misaligned data in an out-of-order execution computer system.
Figure 8B:
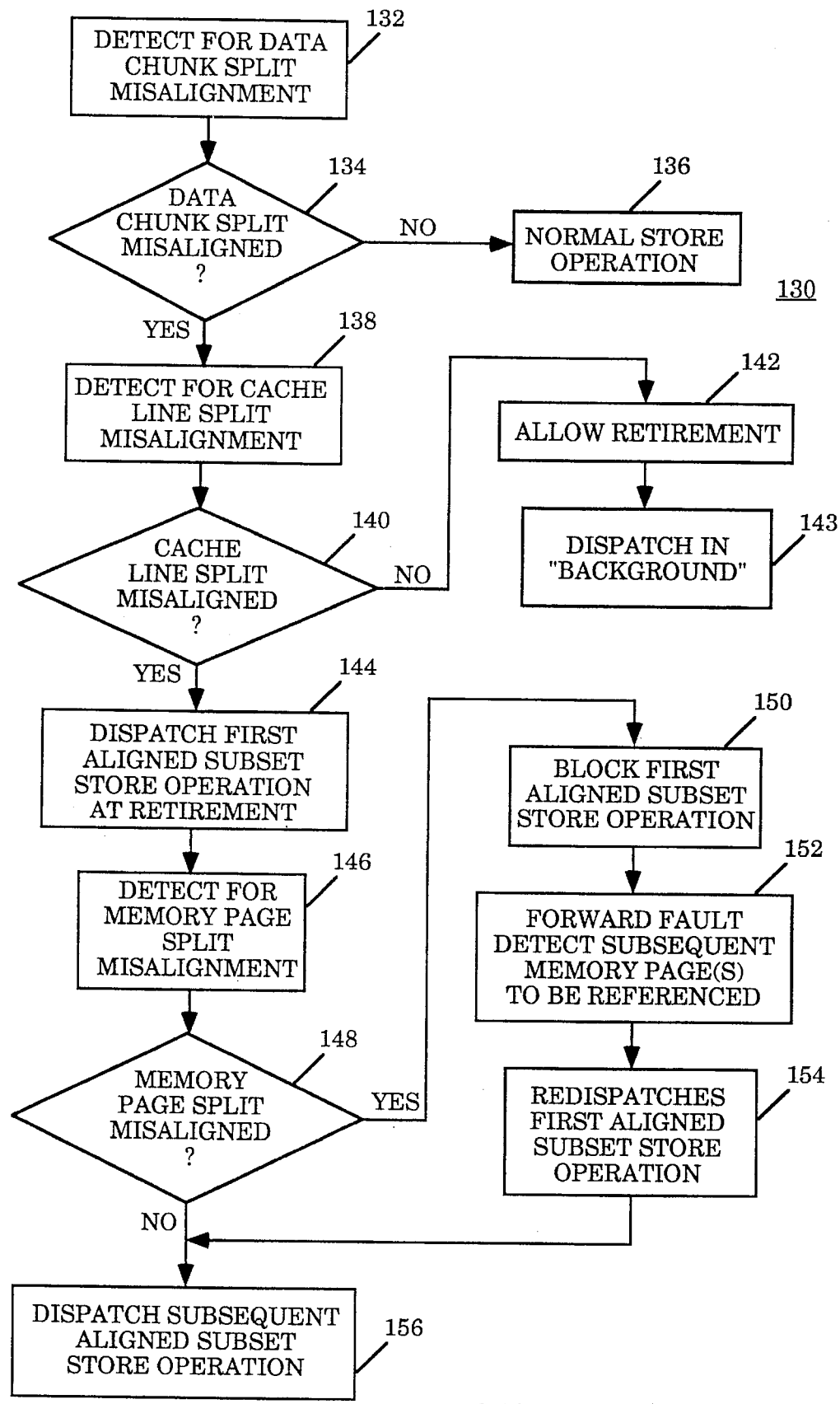

Referring now to FIGS. 8a–8b, two block diagrams summarizing the method steps of the present invention are shown. As illustrated, a load/store operation is first checked for data chunk split misalignment by the AGU 30 when the load/store operation is dispatched from the RS 35 to the MOB 25, step 102 or 132. If the load/store operation is not data chunk split misaligned, the load/store operation is handled as normal load/store operation by the MOB 25, step 106 or 136.

If the load/store operation is detected to be data chunk split misaligned, the load/store operation is further checked by the MOB 25 for cache line split misalignment, step 108 or 138. If a misaligned load operation is merely data chunk split misaligned, the misaligned load operation is held till it is retirable, i.e. the load data is ready to be committed to processor state, and dispatched at retirement by the MOB 25 to the DC 20, step 112. On the other hand, if a misaligned store operation is merely data chunk split misaligned, the misaligned store operation is allowed to be retired by the MOB 25, step 142, i.e. the store data is ready to be committed to system state, and then dispatched in due course by the MOB 25 to the DC 20, step 143.

If the data chunk split misaligned load/store operation is also cache line split misaligned, a first of successive aligned subset load/store operations is dispatched for the misaligned load/store operation at retirement by the MOB 25, step 114 or 144. Detection is further performed by the DTLB 28 for memory page split misalignment, step 116 or 146. If the misaligned load/store operation is merely cache line split misaligned, the subsequent aligned subset load/store operations are dispatched for the misaligned load/store operation by the MOB 25, step 128 or 158.

If the cache line split misaligned load/store operation is also memory page split misaligned, the first aligned subset load/store operation is caused to be blocked by the DTLB 28, step 120 or 150. The memory pages to be referenced by the subsequent aligned subset load/store operations are checked by the DTLB 28 to ensure faults will not be generated, step 124 or 152. Upon ensuring fault will not be generated, the first aligned subset load/store operation is redispatched by the MOB 25, step 126 or 154. Then, the subsequent aligned subset load/store operations are dispatched by the MOB 25 to DC 20, step 128, or 156. Any fault or potential fault to be encountered is written back to the EU 14, and handled by normal fault processing.

While the present invention has been described in terms of the illustrated embodiments, those skilled in the art will recognize that the invention is not limited to the embodiments described. The method and apparatus of the present invention can be practiced with modification and alteration within the spirit and scope of the appended claims. In particular, with additional hardware and logic for checking data chunk split misaligned load operations against buffered store operations, data chunk split misaligned load operations may be dispatched like aligned load operations without having to hold them and dispatch them concurrent with retirement. The description is thus to be regarded as illustrative instead of limiting on the present invention.

What is claimed is:

1. In an out-of-order (OOO) computer system comprising an instruction fetch and issue unit for fetching and issuing instructions, an OOO execution unit (EU) for executing instructions, a memory subsystem (MEM) for storing data, and at least one memory ordering interface (MOI) component coupled to said EU and said MEM for interfacing between said EU and MEM, an apparatus for performing a data load operation of misaligned data from said memory subsystem into said execution unit, said apparatus comprising:

(a) first misalignment detection circuitry disposed in either said EU or said at least one MOI component for detecting data chunk split misalignment for said load operation when said load operation is dispatched from said EU to said MEM; and (b) buffering circuitry disposed in said at least one MOI component and coupled to said first misalignment detection circuitry for buffering said load operation, and dispatching said load operation to said MEM non-speculatively if data chunk split misalignment is detected for said load operation.

2. The apparatus as set forth in claim 1, wherein, said apparatus further comprises (c) second misalignment detection circuitry disposed in either said EU or said at least one MOI component for detecting cache line split misalignment for said load operation when said load operation is dispatched from said EU to said MEM;

said buffering circuitry being also coupled to said second misalignment detection circuitry further dispatches said load operation as successive aligned subset load operations, each destined for a subset of source memory locations that are data boundary aligned if cache line split misalignment is detected for said load operation.

3. The apparatus as set forth in claim 2, wherein, said apparatus further comprises (d) address and data size calculation circuitry coupled to said buffering circuitry and disposed in the same MOI component as said buffering circuitry for incrementing addresses and decrementing data sizes for each subsequent one of said successive aligned subset load operations to be dispatched for said load operation.

4. The apparatus as set forth in claim 2, wherein said apparatus further comprises:

(d) third misalignment detection circuitry disposed in said at least one MOI component coupled to said buffering circuitry for detecting memory page split misalignment for said load operation when a first of said successive aligned subset load operations is dispatched by said buffering circuitry;

(e) first fault generation circuitry disposed in said at least one MOI component and coupled to said third misalignment detection circuitry for faulting said first of said successive aligned subset load operations if memory page split misalignment is detected for said load operation; and (f) second fault generation circuitry disposed in said at least one MOI component for also faulting said first of said successive aligned subset load operations if at least one reference to a memory page to be referenced by a subsequent one of said successive aligned subset load operations would result in fault.

5. The apparatus as set forth in claim 4, wherein said buffering circuitry further redispatches said first of said successive aligned subset load operations for said load operation if said first of said successive aligned subset load operation was only faulted for said load operation being also memory page split misaligned, and then dispatches each subsequent one of said successive aligned subset load operations.

6. The apparatus as set forth in claim 5, wherein, said EU comprises an address generation unit for generating a linear address for said load operation, said address generation unit comprising said first misalignment detection circuitry;

said at least one MOI component comprises a memory order buffer (MOB) having a load buffer (LB) for buffering load operations, said LB comprising said buffering circuitry and said second misalignment detection circuitry;

said at least one MOI component further comprises a data translation lookaside buffer (DTLB), said DTLB comprising said third alignment detection circuitry, and said first and second fault generation circuitry.

7. In an out-of-order (OOO) computer system comprising an instruction fetch and issue unit for fetching and issuing instructions, an OOO execution unit (EU) for executing instructions, a memory subsystem (MEM) for storing data, and at least one memory ordering interface (MOI) component coupled to said EU and said MEM for interfacing between said EU and MEM, an apparatus for performing a data load operation of misaligned data from said memory subsystem into said execution unit, said apparatus comprising:

(a) first misalignment detection circuitry disposed in either said EU or said at least one MOI component for detecting cache line split misalignment for said load operation when said load operation is dispatched from said EU to said MEM; and (b) buffering circuitry disposed in said at least one MOI component and coupled to said first misalignment detection circuitry for buffering said load operation, and dispatching said load operation to said MEM non-speculatively if data chunk split misalignment is detected for said load operation, said buffering circuitry dispatching said cache line split misaligned load operation as successive aligned subset load operations, each destined for a subset of source memory locations that are data boundary aligned.

8. The apparatus as set forth in claim 7, wherein, said apparatus further comprises (c) address and data size calculation circuitry coupled to said buffering circuitry and disposed in the same MOI component as said buffering circuitry for incrementing addresses and decrementing data sizes for each subsequent one of said successive aligned subset load operations to be dispatched for said load operation.

9. The apparatus as set forth in claim 7, wherein said apparatus further comprises:

(c) second misalignment detection circuitry disposed in either said EU or said at least one MOI component coupled to said buffering circuitry for detecting memory page split misalignment for said load operation when a first of said successive aligned subset load operations is dispatched by said buffering circuitry;

(d) first fault generation circuitry disposed in said at least one MOI component and coupled to said second misalignment detection circuitry for faulting said first of said successive aligned subset load operations if memory page split misalignment is detected for said load operation; and (e) second fault generation circuitry disposed in said at least one MOI component for also faulting said first of said successive aligned subset load operations if at least one reference to a memory page to be referenced by a subsequent one of said successive aligned subset load operations would result in fault.

10. The apparatus as set forth in claim 9, wherein said buffering circuitry further redispatches said first of said successive aligned subset load operations for said load operation if said first of said successive aligned subset load operation was only faulted for said load operation being also memory page split misaligned, and then dispatches each subsequent one of said successive aligned subset load operations.

11. The apparatus as set forth in claim 10, wherein, said at least one MOI component comprises a memory order buffer (MOB) having a load buffer (LB) for buffering load operations, said LB comprising said buffering circuitry and said first misalignment detection circuitry;

said at least one MOI component further comprises a data translation lookaside buffer (DTLB), said DTLB comprising said second alignment detection circuitry, and said first and second fault generation circuitry.

12. In an out-of-order (OOO) computer system comprising an instruction fetch and issue unit for fetching and issuing instructions, an OOO s execution unit (EU) for executing instructions, a memory subsystem (MEM) for storing data, and at least one memory ordering interface (MOI) component coupled to said EU and said MEM for interfacing between said EU and MEM, an apparatus for performing a data load operation of misaligned data from said memory subsystem into said execution unit, said apparatus comprising:

(a) first misalignment detection circuitry disposed in either said EU or said at least one MOI component coupled to said buffering circuitry for detecting memory page split misalignment for said load operation when a first of successive aligned subset load operations is dispatched for said load operation;

(b) first fault generation circuitry disposed in said at least one MOI component and coupled to said first misalignment detection circuitry for faulting said first of said successive aligned subset load operations if memory page split misalignment is detected for said load operation; and (c) second fault generation circuitry disposed in said at least one MOI component for also faulting said first of said successive aligned subset load operations if at least one reference to a memory page to be referenced by a subsequent one of said successive aligned subset load operations would result in fault.

13. The apparatus as set forth in claim 12, wherein, said at least one MOI component comprises a data translation lookaside buffer (DTLB), said DTLB comprising said first alignment detection circuitry, and said first and second fault generation circuitry.

14. In an out-of-order (OOO) computer system comprising an instruction fetch and issue unit for fetching and issuing instructions, an OOO execution unit (EU) for executing instructions, a memory subsystem (MEM) for storing data, and at least one memory ordering interface (MOI) component coupled to said EU and said MEM for interfacing between said EU and MEM, a method for performing a data load operation of misaligned data from said memory subsystem into said execution unit, said method comprising the steps of:

(a) detecting data chunk split misalignment for said load operation when said load operation is dispatched from said EU to said MEM; and (b) buffering said load operation, and dispatching said load operation to said MEM non-speculatively if data chunk split misalignment is detected for said load operation;

(b.1) dispatching a first of said successive aligned subset load operations;

(b.2) detecting memory page split misalignment for said load operation when said first of said successive aligned subset load operations is dispatched;

(b.3) faulting said first of said successive aligned subset load operations if memory page split misalignment is also detected for said load operation;

(b.4) faulting also said first of said successive aligned subset load operations if at least one reference to a memory page to be referenced by a subsequent one of said successive aligned subset load operations would result in fault;

(b.5) redispatching said first of said successive aligned subset load operations if said first of said successive aligned subset load operations is faulted for only memory page split misalignment being detected for said load operation; and (b.6) dispatching each subsequent one of said successive aligned subset load operations if either memory page split misalignment is not detected for said load operation, or memory page split misalignment is detected for said load operation but said first of said successive aligned subset load operation is redispatched.

15. The method as set forth in claim 14, wherein, said step (a) further comprises detecting cache line split misalignment for said load operation when said load operation is dispatched from said EU to said MEM if said load operation is detected to be data chunk split misaligned;

said step (b) comprises dispatching said load operation as successive aligned subset load operations, each destined for a subset of source memory locations that are data boundary aligned if cache line split misalignment is also detected for said load operation.

16. The method as set forth in claim 15, wherein said step (b) comprises:

(b.1) dispatching a first of said successive aligned subset load operations;

(b.2) detecting memory page split misalignment for said load operation when said first of said successive aligned subset load operations is dispatched;

(b.3) faulting said first of said successive aligned subset load operations if memory page split misalignment is also detected for said load operation;

(b.4) faulting also said first of said successive aligned subset load operations if at least one reference to a memory page to be referenced by a subsequent one of said successive aligned subset load operations would result in fault;

(b.5) redispatching said first of said successive aligned subset load operations if said first of said successive aligned subset load operations is faulted for only memory page split misalignment being detected for said load operation; and (b.6) dispatching each subsequent one of said successive aligned subset load operations if either memory page split misalignment is not detected for said load operation, or memory page split misalignment is detected for said load operation but said first of said successive aligned subset load operation is redispatched.

17. An out-of-order (OOO) execution processor comprising:

(a) a data cache (DC) for caching data;

(b) an instruction fetch and issue unit for fetching and issuing instructions;

(c) an execution unit (EU) coupled to the instruction fetch and issue unit comprising an address generation unit (AGU) for generating a linear address for a load operation dispatched from said EU, said AGU having a first misalignment detection circuitry for detecting data chunk split misalignment for said load operation when said load operation is dispatched from said EU to said MEM;

(d) a memory order buffer (MOB) coupled to said EU and said DC comprising a load buffer (LB) having buffering circuitry for buffering said load operation dispatched from said EU, and dispatching said load operation to said DC non-speculatively if data chunk split misalignment is detected for said load operation.

18. The processor as set forth in claim 17, wherein, said LB further having second misalignment detection circuitry for detecting cache line split misalignment for said load operation when said load operation is dispatched from said EU to said MEM;

said buffering circuitry being also coupled to said second misalignment detection circuitry further dispatches said load operation as successive aligned subset load operations, each destined for a subset of source memory locations that are data boundary aligned if cache line split misalignment is detected for said load operation.

19. The processor as set forth in claim 18, wherein said processor further comprises (e) a data translation lookaside buffer (DTLB) coupled to said MOB and said DC for translating a linear address to a physical address, and performing a number of fault detections, said DTLB having fault detection circuitry comprising:

(e.1) third misalignment detection circuitry for detecting memory page split misalignment for said load operation when a first of said successive aligned subset load operations is dispatched by said buffering circuitry;

(e.2) first fault generation circuitry coupled to said third misalignment detection circuitry for faulting said first of said successive aligned subset load operations if memory page split misalignment is detected for said load operation; and (e.3) second fault generation circuitry for also faulting said first of said successive aligned subset load operations if at least one reference to a memory page to be referenced by a subsequent one of said successive aligned subset load operations would result in fault.

20. The processor as set forth in claim 19, wherein said buffering circuitry further redispatches said first of said successive aligned subset load operations for said load operation if said first of said successive aligned subset load operation was only faulted for said load operation being also memory page split misaligned, and then dispatched each subsequent one of said successive aligned subset load operations.

21. The processor as forth in claim 20, wherein said processor is disposed in a single silicon based integrated circuit.

22. An out-of-order (OOO) computer system comprising:
   (a) a main memory for storing data;
   (b) a data cache (DC) coupled to said main memory for caching a subset of said data stored in said main memory;
   (c) an instruction fetch and issue unit for fetching and issuing instructions;
   (d) an execution unit (EU) coupled to the instruction fetch and issue unit comprising a first misalignment detection circuitry for detecting data chunk split misalignment for said load operation when said load operation is dispatched from said EU to said MEM;
   (e) a memory order buffer (MOB) coupled to said EU and said DC comprising buffering circuitry for buffering said load operation dispatched from said EU, and dispatching said load operation to said DC non-speculatively if data chunk split misalignment is detected for said load operation.

23. The computer system as set forth in claim 22, wherein,
   said MOB further having second misalignment detection circuitry for detecting cache line split misalignment for said load operation when said load operation is dispatched from said EU to said MEM;
   said buffering circuitry being also coupled to said second misalignment detection circuitry further dispatches said load operation as successive aligned subset load operations, each destined for a subset of source memory locations that are data boundary aligned if cache line split misalignment is detected for said load operation.

24. The computer system as set forth in claim 23, wherein said computer system further comprises (f) a data translation lookaside buffer (DTLB) coupled to said MOB and said DC for translating a linear address to a physical address, and performing a number of fault detections, said DTLB having fault detection circuitry comprising:
   (f.1) third misalignment detection circuitry for detecting memory page split misalignment for said load operation when a first of said successive aligned subset load operations is dispatched by said buffering circuitry;
   (f.2) first fault generation circuitry coupled to said third misalignment detection circuitry for faulting said first of said successive aligned subset load operations if memory page split misalignment is detected for said load operation; and
   (d.3) second fault generation circuitry for also faulting said first of said successive aligned subset load operations if at least one reference to a memory page to be referenced by a subsequent one of said successive aligned subset load operations would result in fault.

25. The computer system as set forth in claim 24, wherein said buffering circuitry further redispatches said first of said successive aligned subset load operations for said load operation if said first of said successive aligned subset load operation was only faulted for said load operation being also memory page split misaligned, and then dispatched each subsequent one of said successive aligned subset load operations.

26. In an out-of-order (OOO) computer system comprising an instruction fetch and issue unit for fetching and issuing instructions, an OOO execution unit (EU) for executing instructions, a memory subsystem (MEM) for storing data, and at least one memory ordering interface (MOI) component coupled to said EU and said MEM for interfacing between said EU and MEM, an apparatus for performing a data store operation of misaligned data from said memory subsystem into said execution unit, said apparatus comprising:
   a) first misalignment detection circuitry disposed in either said EU or said at least one MOI component for detecting data chunk split misalignment for said store operation when said store operation is dispatched from said EU to said MEM; and
   b) buffering circuitry disposed in said at least one MOI component and coupled to said first misalignment detection circuitry for buffering said store operation, allowing said misaligned data of said store operation to be promoted to a system commitment ready state, and dispatching said store operation to said MEM with an appropriate byte mask, after said misaligned data of said store operation has been promoted to said system commitment ready state, if data chunk split misalignment is detected for said store operation.

27. The apparatus as set forth in claim 26, wherein,
   said apparatus further comprises (c) second misalignment detection circuitry disposed in either said EU or said at least one MOI component for detecting cache line split misalignment for said store operation when said store operation is dispatched from said EU to said MEM;
   said buffering circuitry being also coupled to said second misalignment detection circuitry prevents said misaligned data of said store operation from being promoted to said system commitment ready state if cache line split misalignment is detected for said operation until said store operation is ready to be dispatched to said MEM, and dispatches said store operation as successive aligned subset store operations, each destined for a subset of source memory locations that are data boundary aligned, concurrently with committing said misaligned data of said store operation to system state.

28. The apparatus as set forth in claim 27, wherein, said apparatus further comprises (d) address and data size calculation circuitry coupled to said buffering circuitry and disposed in the same MOI component as said buffering circuitry for incrementing addresses and decrementing data sizes for each subsequent one of said successive aligned subset store operations to be dispatched for said store operation.

29. The apparatus as set forth in claim 27, wherein said apparatus further comprises:
   (d) third misalignment detection circuitry disposed in either said EU or said at least one MOI component coupled to said buffering circuitry for detecting memory page split misalignment for said store operation when a first of said successive aligned subset store operations is dispatched by said buffering circuitry;
   (e) first fault generation circuitry disposed in said at least one MOI component and coupled to said third misalignment detection circuitry for faulting said first of said successive aligned subset store operations if memory page split misalignment is detected for said store operation; and
   (f) second fault generation circuitry disposed in said at least one MOI component for also faulting said first of said successive aligned subset store operations if at least one reference to a memory page to be referenced by a subsequent one of said successive aligned subset store operations would result in fault.

30. The apparatus as set forth in claim 29, wherein said buffering circuitry further redispatches said first of said successive aligned subset store operations for said store operation if said first of said successive aligned subset store operation was only faulted for said store operation being also memory page split misaligned, and then dispatches each subsequent one of said successive aligned subset store operations.

31. The apparatus as set forth in claim 30, wherein, said EU comprises an address generation unit for generating a linear address for said store operation, said address generation unit comprising said first misalignment detection circuitry;

said at least one MOI component comprises a memory order buffer (MOB) having a store buffer (SB) for buffering store operations, said SB comprising said buffering circuitry and said second misalignment detection circuitry;

said at least one MOI component further comprises a data translation lookaside buffer (DTLB), said DTLB comprising said third alignment detection circuitry, and said first and second fault generation circuitry.

32. In an out-of-order (OOO) computer system comprising an instruction fetch and issue unit for fetching and issuing instructions, an OOO execution unit (EU) for executing instructions, a memory subsystem (MEM) for storing data, and at least one memory ordering interface (MOI) component coupled to said EU and said MEM for interfacing between said EU and MEM, an apparatus for performing a data store operation of misaligned data from said memory subsystem into said execution unit, said apparatus comprising:

(a) first misalignment detection circuitry disposed in either said EU or said at least one MOI component for detecting cache line split misalignment for said store operation when said store operation is dispatched from said EU to said MEM; and (b) buffering circuitry disposed in said at least one MOI component and coupled to said first misalignment detection circuitry for buffering said store operation, preventing said misaligned data of said store operation from being promoted to a system commitment ready state if cache line split misalignment is detected for said store operation until said store operation is ready to be dispatched to said MEM, and dispatching said cache line split misaligned store operation as successive aligned subset store operations, each destined for a subset of source memory locations that are data boundary aligned, concurrent with committing said misaligned data of said store operation to system state.

33. The apparatus as set forth in claim 32, wherein, said apparatus further comprises (c) address and data size calculation circuitry coupled to said buffering circuitry and disposed in the same MOI component as said buffering circuitry for incrementing addresses and decrementing data sizes for each subsequent one of said successive aligned subset store operations to be dispatched for said store operation.

34. The apparatus as set forth in claim 32, wherein said apparatus further comprises:

(c) second misalignment detection circuitry disposed in either said EU or said at least one MOI component coupled to said buffering circuitry for detecting memory page split misalignment for said store operation when a first of said successive aligned subset store operations is dispatched by said buffering circuitry;

(d) first fault generation circuitry disposed in said at least one MOI component and coupled to said second misalignment detection circuitry for faulting said first of said successive aligned subset store operations if memory page split misalignment is detected for said store operation; and (e) second fault generation circuitry disposed in said at least one MOI component for also faulting said first of said successive aligned subset store operations if at least one reference to a memory page to be referenced by a subsequent one of said successive aligned subset store operations would result in fault.

35. The apparatus as set forth in claim 34, wherein said buffering circuitry further redispatches said first of said successive aligned subset store operations for said store operation if said first of said successive aligned subset store operation was only faulted for said store operation being also memory page split misaligned, and then dispatches each subsequent one of said successive aligned subset store operations.

36. The apparatus as set forth in claim 35, wherein, said at least one MOI component comprises a memory order buffer (MOB) having a store buffer (SB) for buffering store operations, said SB comprising said buffering circuitry and said first misalignment detection circuitry;

said at least one MOI component further comprises a data translation lookaside buffer (DTLB), said DTLB comprising said second alignment detection circuitry, and said first and second fault generation circuitry.

37. In an out-of-order (OOO) computer system comprising an instruction fetch and issue unit for fetching and issuing instructions, an OOO execution unit (EU) for executing instructions, a memory subsystem (MEM) for storing data, and at least one memory ordering interface (MOI) component coupled to said EU and said MEM for interfacing between said EU and MEM, an apparatus for performing a data store operation of misaligned data from said memory subsystem into said execution unit, said apparatus comprising:

(a) first misalignment detection circuitry disposed in either said EU or said at least one MOI component coupled to said buffering circuitry for detecting memory page split misalignment for said store operation when a first of successive aligned subset store operations is dispatched for said store operation;

(b) first fault generation circuitry disposed in said at least one MOI component and coupled to said first misalignment detection circuitry for faulting said first of said successive aligned subset store operations if memory page split misalignment is detected for said store operation; and (c) second fault generation circuitry disposed in said at least one MOI component for also faulting said first of said successive aligned subset store operations if at least one reference to a memory page to be referenced by a subsequent one of said successive aligned subset store operations would result in fault.

38. The apparatus as set forth in claim 37, wherein, said at least one MOI component comprises a data translation lookaside buffer (DTLB), said DTLB comprising said first alignment detection circuitry, and said first and second fault generation circuitry.

39. In an out-of-order (OOO) computer system comprising an instruction fetch and issue unit for fetching and issuing instructions, an OOO execution unit (EU) for executing instructions, a memory subsystem (MEM) for storing data, and at least one memory ordering interface (MOI) component coupled to said EU and said MEM for interfacing between said EU and MEM, a method for performing a data store operation of misaligned data from said memory subsystem into said execution unit, said method comprising the steps of:

(a) detecting data chunk split misalignment for said store operation when said store operation is dispatched from said EU to said MEM; and (b) buffering said store operation, allowing said misaligned data of said store operation to be promoted to a system commitment ready state, and dispatching said store operation to said MEM with an appropriate byte mask, after said misaligned data of said store operation has been promoted to said system commitment ready state, if data chunk split misalignment is detected for said store operation.

40. The method as set forth in claim 39, wherein, said step (a) further comprises detecting cache line split misalignment for said store operation when said store operation is dispatched from said EU to said MEM if said store operation is detected to be data chunk split misaligned;

said step (b) comprises preventing said misaligned data of said store operation from being promoted to said system commitment ready state until said store operation is ready to be dispatched to said MEM instead if cache line split misalignment is also detected for said store operation, and dispatching said store operation as successive aligned subset store operations, each destined for a subset of source memory locations that are data boundary aligned, concurrent with committing said misaligned data of said store operation to system state.

41. The method as set forth in claim 40, wherein said dispatching of said cache line split misaligned store operation as successive aligned subset store operations in said step (b) comprises:

(b.1) dispatching a first of said successive aligned subset store operations;

(b.2) detecting memory page split misalignment for said store operation when said first of said successive aligned subset store operations is dispatched;

(b.3) faulting said first of said successive aligned subset store operations if memory page split misalignment is also detected for said store operation;

(b.4) faulting also said first of said successive aligned subset store operations if at least one reference to a memory page to be referenced by a subsequent one of said successive aligned subset store operations would result in fault;

(b.5) redispatching said first of said successive aligned subset store operations if said first of said successive aligned subset store operations is faulted for only memory page split misalignment being detected for said store operation; and (b.6) dispatching each subsequent one of said successive aligned subset store operations if either memory page split misalignment is not detected for said store operation, or memory page split misalignment is detected for said store operation but said first of said successive aligned subset store operation is redispatched.

42. An out-of-order (OOO) execution processor comprising:

(a) a data cache (DC) for caching data;

(b) an instruction fetch and issue unit for fetching and issuing instructions;

(c) an execution unit (EU) coupled to said instruction fetch and issue unit comprising an address generation unit (AGU) for generating a linear address for a store operation dispatched from said EU, said AGU having a first misalignment detection circuitry for detecting data chunk split misalignment for said store operation when said store operation is dispatched from said EU to said MEM;

(d) a memory order buffer (MOB) coupled to said EU and said DC comprising a store buffer (SB) having buffering circuitry for buffering said store operation dispatched from said EU, allowing said misaligned data of said store operation to be promoted to a system commitment ready state, and dispatching said store operation to said DC with an appropriate byte mask, after said misaligned data of said store operation has been promoted to said system commitment ready state, if data chunk split misalignment is detected for said store operation.

43. The processor as set forth in claim 42, wherein, said SB further having second misalignment detection circuitry for detecting cache line split misalignment for said store operation when said store operation is dispatched from said EU to said MEM;

said buffering circuitry being also coupled to said second misalignment detection circuitry prevents said misaligned data of said store operation from being promoted to said system commitment ready state until said store operation is ready to be dispatched to said MEM if cache line split misalignment is detected for said store operation, and dispatches said store operation as successive aligned subset store operations, each destined for a subset of source memory locations that are data boundary aligned, concurrent with committing said misaligned data of said store operation to system state.

44. The processor as set forth in claim 43, wherein said processor further comprises (e) a data translation lookaside buffer (DTLB) coupled to said MOB and said DC for translating a linear address to a physical address, and performing a number of fault detections, said DTLB having fault detection circuitry comprising:

(e.1) third misalignment detection circuitry for detecting memory page split misalignment for said store operation when a first of said successive aligned subset store operations is dispatched by said buffering circuitry;

(e.2) first fault generation circuitry coupled to said third misalignment detection circuitry for faulting said first of said successive aligned subset store operations if memory page split misalignment is detected for said store operation; and (e.3) second fault generation circuitry for also faulting said first of said successive aligned subset store operations if at least one reference to a memory page to be referenced by a subsequent one of said successive aligned subset store operations would result in fault.

45. The processor as set forth in claim 44, wherein said buffering circuitry further redispatches said first of said successive aligned subset store operations for said store operation if said first of said successive aligned subset store operation was only faulted for said store operation being also memory page split misaligned, and then dispatched each subsequent one of said successive aligned subset store operations.

46. The processor as forth in claim 45, wherein said processor is disposed in a single silicon based integrated circuit.

47. An out-of-order (OOO) computer system comprising:
   (a) a main memory for storing data;
   (b) a data cache (DC) coupled to said main memory for caching a subset of said data stored in said main memory;
   (c) an instruction fetch and issue unit for fetching and issuing instructions;
   (d) an execution unit (EU) coupled to said instruction fetch and issue unit comprising a first misalignment detection circuitry for detecting data chunk split misalignment for said store operation when said store operation is dispatched from said EU to said MEM;
   (e) a memory order buffer (MOB) coupled to said EU and said DC comprising buffering circuitry for buffering said store operation dispatched from said EU, allowing said misaligned data of said store operation to be promoted to a system commitment ready state, and dispatching said store operation to said DC with an appropriate byte mask, after said misaligned data of said stoe operation has been promoted to said system commitment ready state, if data chunk split misalignment is detected for said store operation.

48. The computer system as set forth in claim 47, wherein, said MOB further having second misalignment detection circuitry for detecting cache line split misalignment for said store operation when said store operation is dispatched from said EU to said MEM;

said buffering circuitry being also coupled to said second misalignment detection circuitry prevents said misaligned data of said store operation from being promoted to said system commitment ready state until said store operation is ready to be dispatched to said MEM if cache line split misalignment is detected for said store operation, and dispatches said store operation as successive aligned subset store operations, each destined for a subset of source memory locations that are data boundary aligned, concurrent with committing said misaligned data of said store operation to system state.

49. The computer system as set forth in claim 48, wherein said computer system further comprises (e) a data translation lookaside buffer (DTLB) coupled to said MOB and said DC for translating a linear address to a physical address, and performing a number of fault detections, said DTLB having fault detection circuitry comprising:
   (e.1) third misalignment detection circuitry for detecting memory page split misalignment for said store operation when a first of said successive aligned subset store operations is dispatched by said buffering circuitry;
   (e.2) first fault generation circuitry coupled to said third misalignment detection circuitry for faulting said first of said successive aligned subset store operations if memory page split misalignment is detected for said store operation; and
   (e.3) second fault generation circuitry for also faulting said first of said successive aligned subset store operations if at least one reference to a memory page to be referenced by a subsequent one of said successive aligned subset store operations would result in fault.

50. The computer system as set forth in claim 49, wherein said buffering circuitry further redispatches said first of said successive aligned subset store operations for said store operation if said first of said successive aligned subset store operation was only faulted for said store operation being also memory page split misaligned, and then dispatched each subsequent one of said successive aligned subset store operations.

51. In an out-of-order (OOO) computer system comprising an instruction fetch and issue unit for fetching and issuing instructions, an OOO execution unit (EU) for executing instructions, a memory subsystem (MEM) for storing data, and at least one memory ordering interface (MOI) component coupled to said EU and said MEM for interfacing between said EU and MEM, an apparatus for performing data load operation of misaligned data from said memory subsystem into said execution unit, said apparatus comprising:
   a) at least one misalignment detection circuitry disposed in either said EU or said at least one MOI component for detecting at least one type of data misalignment for said load operation when said load operation is dispatched from said EU to said MEM; and
   b) buffering circuitry disposed in said at least one MOI component and coupled to said at least one misalignment detection circuitry for buffering said load operation, and dispatching said load operation to said MEM in a manner depending on whether data misalignment is detected for said load operation, and the type of data misalignment detected.

52. In an out-of-order (OOO) computer system comprising an instruction fetch and issue unit for fetching and issuing instructions, an OOO execution unit (EU) for executing instructions, a memory subsystem (MEM) for storing data, and at least one memory ordering interface (MOI) component coupled to said EU and said MEM for interfacing between said EU and MEM, an apparatus for performing a data store operation of misaligned data from said memory subsystem into said execution unit, said apparatus comprising:
   a) at least one misalignment detection circuitry disposed in either said EU or said at least one MOI component for detecting at least one type of data misalignment for said store operation when said store operation is dispatched from said EU to said MEM; and
   b) buffering circuitry disposed in said at least one MOI component and coupled to said at least one misalignment detection circuitry for buffering said store operation, and dispatching said store operation to said MEM in a manner depending on whether data misalignment is detected for said store operation, and the type of data misalignment detected.

* * * * *

UNITED STATES PATENT AND TRADEMARK OFFICE
CERTIFICATE OF CORRECTION

PATENT NO. : 5,577,200
DATED : November 19, 1996
INVENTOR(S) : Abramson, et. al.

It is certified that error appears in the above-indentified patent and that said Letters Patent is hereby corrected as shown below:

Column 16, line 36, delete "s" following 000 and prior to execution--.

Signed and Sealed this

Sixth Day of May, 1997

Attest:

BRUCE LEHMAN

*Attesting Officer*     *Commissioner of Patents and Trademarks*